(12) United States Patent
Gupta

(10) Patent No.: US 8,982,934 B2
(45) Date of Patent: Mar. 17, 2015

(54) SYMBOL-GATED DISCONTINUOUS MODE FOR EFFICIENT POWER MANAGEMENT OF DIGITAL SUBSCRIBER LINE TRANSCEIVERS

(71) Applicant: Futurewei Technologies, Co., Plano, TX (US)

(72) Inventor: Sanjay Gupta, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 99 days.

(21) Appl. No.: 13/631,344

(22) Filed: Sep. 28, 2012

(65) Prior Publication Data

US 2013/0107917 A1 May 2, 2013

Related U.S. Application Data

(60) Provisional application No. 61/554,844, filed on Nov. 2, 2011.

(51) Int. Cl.
| | | |
|---|---|---|
| *H04B 1/38* | (2006.01) | |
| *H04L 5/16* | (2006.01) | |
| *H04L 27/30* | (2006.01) | |
| *H04L 5/00* | (2006.01) | |
| *H04L 27/00* | (2006.01) | |

(52) U.S. Cl.
CPC .............. *H04L 27/30* (2013.01); *H04L 5/0098* (2013.01); *H04L 27/0002* (2013.01)
USPC ............ 375/222; 375/259; 375/295; 375/316

(58) Field of Classification Search
CPC ............... H04B 2001/38; H04B 14/00; H04B 2001/02; H04B 2001/06; H04B 1/02; H04B 1/06; H04B 1/38
USPC .......................... 375/219, 222, 259, 295, 316
See application file for complete search history.

(56) References Cited

U.S. PATENT DOCUMENTS

| | | | |
|---|---|---|---|
| 4,462,101 A * | 7/1984 | Yasuda et al. ................. | 714/794 |
| 5,551,078 A * | 8/1996 | Connell et al. ............. | 455/343.3 |
| 6,856,597 B1 * | 2/2005 | Scott ............................. | 370/234 |
| 2005/0037795 A1 * | 2/2005 | Aaltonen et al. .............. | 455/522 |

(Continued)

FOREIGN PATENT DOCUMENTS

| | | |
|---|---|---|
| CN | 101924964 A | 12/2010 |
| WO | 2007146048 A2 | 12/2007 |

OTHER PUBLICATIONS

Foreign Communication From A Counterpart Application, PCT Application No. PCT/CN2012/083988, International Search Report dated Mar. 28, 2013, 6 pages.

(Continued)

*Primary Examiner* — Jean B Corrielus
(74) *Attorney, Agent, or Firm* — Conley Rose, P.C.; Grant Rodolph; William H. Dietrich

(57) ABSTRACT

An apparatus comprising a digital subscriber line (DSL) transmitter configured to transmit a discrete multi-tone (DMT) superframe comprising a sync frame and a data frame, wherein a time duration of the superframe is equal to at least a sum of a time duration of the sync frame and twice a time duration of the data frame, and turn off at least a portion of the DSL transmitter for a portion of the time duration of the superframe, wherein the portion of the time duration is no shorter than the duration of the data frame.

37 Claims, 10 Drawing Sheets

(56) References Cited

U.S. PATENT DOCUMENTS

| | | |
|---|---|---|
| 2005/0135247 A1 | 6/2005 | Scott |
| 2006/0078044 A1 | 4/2006 | Norrell et al. |
| 2014/0093012 A1* | 4/2014 | Zhang et al. .................. 375/295 |

OTHER PUBLICATIONS

Foreign Communication From A Counterpart Application, PCT Application No. PCT/CN2012/083988, Written Opinion dated Mar. 28, 2013, 4 pages.

"Series G: Transmission Systems and Media, Digital Systems and Networks, Digital Sections and Digital Line System-Access Networks, Asymmetric Digital Subscriber Line Transceivers 2 (ADSL2) Amendment 4," ITU-T G.992.3, Amendment 4, Oct. 2011, 9 pages.

"Series G: Transmission Systems and Media, Digital Systems and Networks, Digital Sections and Digital Line System-Access Networks, Asymmetric Digital Subscriber Line (ADSL) Transceivers—Extended Bandwidth ADSL2 (ADSL2plus), Corrigendum 1: Upstream Optional D0 Values," ITU-T G.992.5, Corrigendum 1, Nov. 2010, 8 pages.

Humphrey, L., et al., "G.VDSL: Operator Requirements for a Future VDSL2 Low Power Mode," ITU Study Group 15, Question 4/15, Temporary Document 10RB-045, BT PLC, Redbank, New Jersey, Nov. 15-19, 2010, 3 pages.

Humphrey, L., et al., "G. VDSL: Low Power Modes for Remote VDSL2 Nodes," ITU Study Group 15, Question 4/15, Temporary Document 10RB-046, BT PLC, Geneva, Switzerland, Nov. 15-19, 2010, 3 pages.

Humphrey, L., et al., "G. Fast: Discontinuous Operation," ITU Study Group 15, Question 4/15, Temporary Document 11BM-035, BT PLC, Bedford, Massachusetts, Jun. 20-24, 2011, 2 pages.

Humphrey, L., et al., "G.VDSL: Discontinuous VDSL2," ITU Study Group 15, Question 4/15, Temporary Document 11II-028, BT PLC, Indianapolis, Indiana, May 3-6, 2011, 3 pages.

Series G: Transmission Systems and Media, Digital Systems and Networks, Digital Sections and Digital Line System-Access Networks, Very High Speed Digital Subscriber Line Transceivers 2 (VDSL 2), ITU-T G. 993.2, Dec. 2011, 382 pages.

"Series G: Transmission Systems and Media, Digital Systems and Networks, Digital Sections and Digital Line System-Access Networks, Self-FEXT Cancellation (Vectoring) for Use with VDSL2 Transceivers," ITU-T G. 993.5, Apr. 2010, 80 pages.

"Series G: Transmission Systems and Media, Digital Systems and Networks, Digital Sections and Digital Line System-Access Networks, Handshake Procedures for Digital Subscriber Line (DSL) Transceivers," ITU-T G. 994.1, Feb. 2007, 848 pages.

"Series G: Transmission Systems and Media, Digital Systems and Networks, Digital Sections and Digital Line Systems-Access Networks, Improved Impulse Noise Protection for DSL Transceivers," ITU-T G. 998.4, Jun. 2010, 78 pages.

Series G: Transmission Systems and Media, Digital Systems and Networks, Digital Sections and Digital Line Systems-Access Networks, Asymmetric Digital Subscriber Line Transceivers 2 (ADSL2), ITU-T G.992.3, Apr. 2009, 296 pages.

Series G: Transmission Systems and Media, Digital Systems and Networks, Digital Sections and Digital Line Systems-Access Networks, Asymmetric Digital Subscriber Line Transceivers 2 (ADSL2), Annex C: Specific Requirements for an ADSL System Operating in the Same Cable as ISDN as Defined in Appendix III of Recommendation ITU-T G.961, ITU-T G.992.3 Annex C, Apr. 2009, 404 pages.

"Recommendation G.lite Draft Document," ITU—Telecommunication Standardization Sector, Study Group 15, AB-008, Aug. 3-7, 1998, 98 pages.

"G.vdsl: Issues list for G.vdsl project," ITU—Telecommunication Standardization Sector, Study Group 15, 11II-U11R2, May 3-6, 2011, 26 pages.

Foreign Communication From A Counterpart Application, European Application No. 12846310.6, Extended European Search Report dated Dec. 8, 2014, 7 pages.

* cited by examiner

SYMBOL-GATED DISCONTINUOUS MODE FOR EFFICIENT POWER MANAGEMENT OF DIGITAL SUBSCRIBER LINE TRANSCEIVERS

CROSS-REFERENCE TO RELATED APPLICATIONS

The present application claims priority to U.S. Provisional Patent Application No. 61/554,844 filed Nov. 2, 2011 by Sanjay Gupta and entitled "A Symbol-Gated Discontinuous Mode for Efficient Power Management of Very High Speed Digital Subscriber Line Transceivers 2", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide a large bandwidth for digital communications over exiting subscriber lines. When transmitting data over subscriber lines, some DSL technologies use a discrete multi-tone (DMT) signal that allocates one or more bits for each sub-carrier or tone in each symbol. The DMT signal may be adjusted to various channel conditions that may occur at each end of a subscriber line. Typically, a plurality of power management (PM) states may be used in DSL technologies. For example, in the International Telecommunication Union Telecommunication Standardization Sector (ITU-T) Recommendation G.992.3 entitled "Asymmetric Digital Subscriber Line Transceivers 2 (ADSL2)" and Recommendation G. 992.5 entitled "Asymmetric Digital Subscriber Line Transceivers 2—Extended Bandwidth (ADSL2 plus or ADSL2+)", which are incorporated herein by reference, three PM or link states are defined. The three PM states comprise a link state for full on mode (denoted as L0), a link state for low power mode (denoted as L2), and a link state for idle mode (denoted as L3). The term state and mode may be used interchangeably herein. For example, a low power mode (LPM) may also be referred to as a low power state.

SUMMARY

In one embodiment, the disclosure includes an apparatus comprising a digital subscriber line (DSL) transmitter configured to transmit a discrete multi-tone (DMT) superframe comprising a sync frame and a data frame, wherein a time duration of the superframe is equal to at least a sum of a time duration of the sync frame and twice a time duration of the data frame, and turn off at least a portion of the DSL transmitter for a portion of the time duration of the superframe, wherein the portion of the time duration is no shorter than the duration of the data frame.

In another embodiment, the disclosure includes a method implemented in a digital subscriber line (DSL) transmitter, the method comprising transmitting a discrete multi-tone (DMT) superframe comprising a sync frame and a data frame, wherein a time duration of the superframe is equal to at least a sum of a time duration of the sync frame and twice a time duration of the data frame, and turning off at least a portion of the DSL transmitter for a portion of the time duration of the superframe, wherein the portion of the time duration is no shorter than the duration of the data frame.

In yet another embodiment, the disclosure includes an apparatus comprising a digital subscriber line (DSL) receiver configured to receive a discrete multi-tone (DMT) superframe comprising a sync frame and a data frame, wherein a time duration of the superframe is equal to at least a sum of a time duration of the sync frame and twice a time duration of the data frame, and turn off at least a portion of the DSL receiver for a portion of the time duration of the superframe, wherein the portion of the time duration is no shorter than the duration of the data frame.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
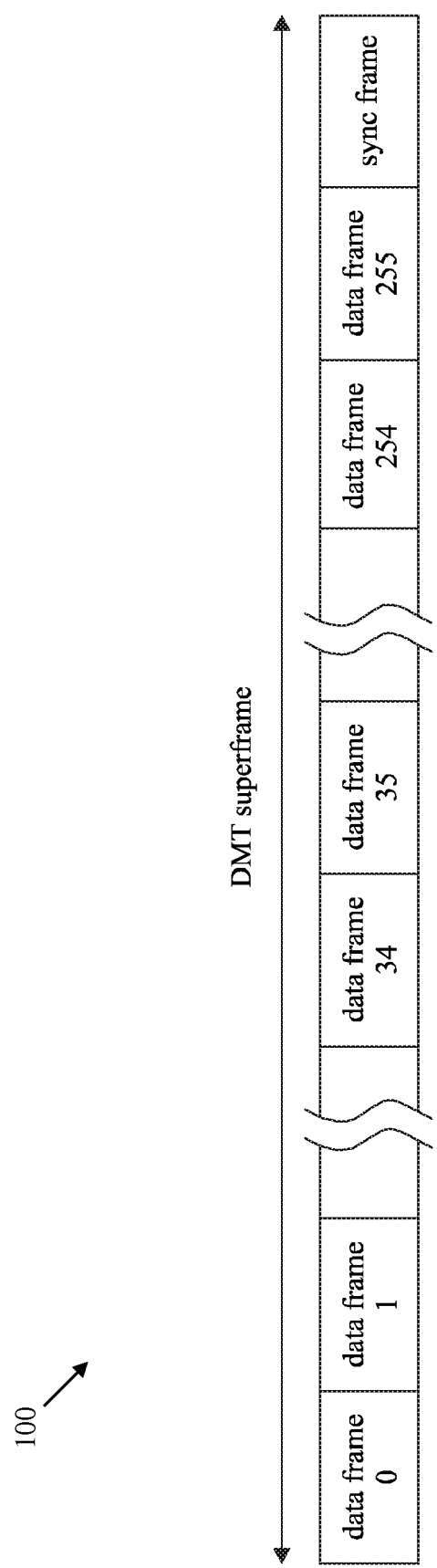
FIG. 1 shows a DMT superframe as defined in G.993.2.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Sometimes, a subscriber line may be idle or have little user traffic. Thus, DSL transmitters and receivers (transceivers) may take advantage of this fact to reduce power consumption by reducing a transmitted or received signal level. A DSL transceiver (e.g., a modem) may be configured to switch between the L0 and L2 modes during periods of intermittent user traffic. For example, the L0 mode may be used during a showtime or full on (sometimes denoted in capitalized form as ON) period of a user traffic duty-cycle. In the L0 mode, the DSL transceiver may be fully functional. On the other hand, the L2 mode may be used during a temporary off (sometimes denoted in capitalized form as OFF) period of the user traffic duty cycle. In the L2 mode, the DSL transceiver may be active but may transmit data at a reduced downstream or upstream rate, so that overall power consumption of the DSL modem may be reduced. In case there is an extended OFF period or down-time in user traffic, the DSL transceiver may be configured to switch to the L3 idle (sometimes denoted in capitalized form as IDLE) mode. Since the DSL transceiver may transmit no data at all in the L3 mode, further power savings may be achieved.

DSL systems are continuously being upgraded. For example, the ITU-T Recommendation G.993.2 entitled "Very High Speed Digital Subscriber Line Transceivers 2 (VDSL2)", which is hereby incorporated by reference, is an upgrade over ADSL2 and ADSL2+, since it may provide various advantages such as higher data rates, more services, and more robustness. Upgrades over VDSL2, such as systems to be defined by future standards ITU-T G.hn or G.fast, are also being developed. In use, the PM states as defined in ADSL2 and ADSL2+ may have potential limitations and/or issues when being incorporated into upgraded DSL systems such as VDSL2 or G.fast. For example, the VDSL2 protocol may impose higher memory requirements and have higher complexity (e.g., an order of magnitude higher) in upstream communication. Certain VDSL2 upstream profiles may have close to 2500 carriers, which is significantly higher than ADSL2+ with only close to 60 carriers. In VDSL2 systems, a relatively higher portion of power may be consumed in analog sections of the transceiver. For another example, VDSL2 may support different application scenarios including video streaming, voice lines, and data services. Each of these services may have different data bandwidth requirements, thus the PM state may need to be broadened to include several tiered power savings modes, which are optimized to meet the different application scenarios.

Further, current DSL standards such as ADSL2, ADSL2+, and VDSL2, only include continuous transmission and receiving modes, in which all frames or symbols of a superframe are transmitted or received consecutively. FIG. 1 shows a DMT superframe 100 as defined in G.993.2, which operates in a continuous transmission mode and may be used by a transmit physical media dependent (PMD) function. The DMT superframe 100 comprises 256 data frames, numbered or indexed from 0 to 255, followed by a sync frame. The 256 data frames are modulated onto 256 data symbols, and the sync frame is modulated onto a sync symbol. The data frames may be transmitted consecutively without temporal gap between any two data frames. The sync frame may be used for synchronization between a DSL transmitter and receiver.

Figure 2:
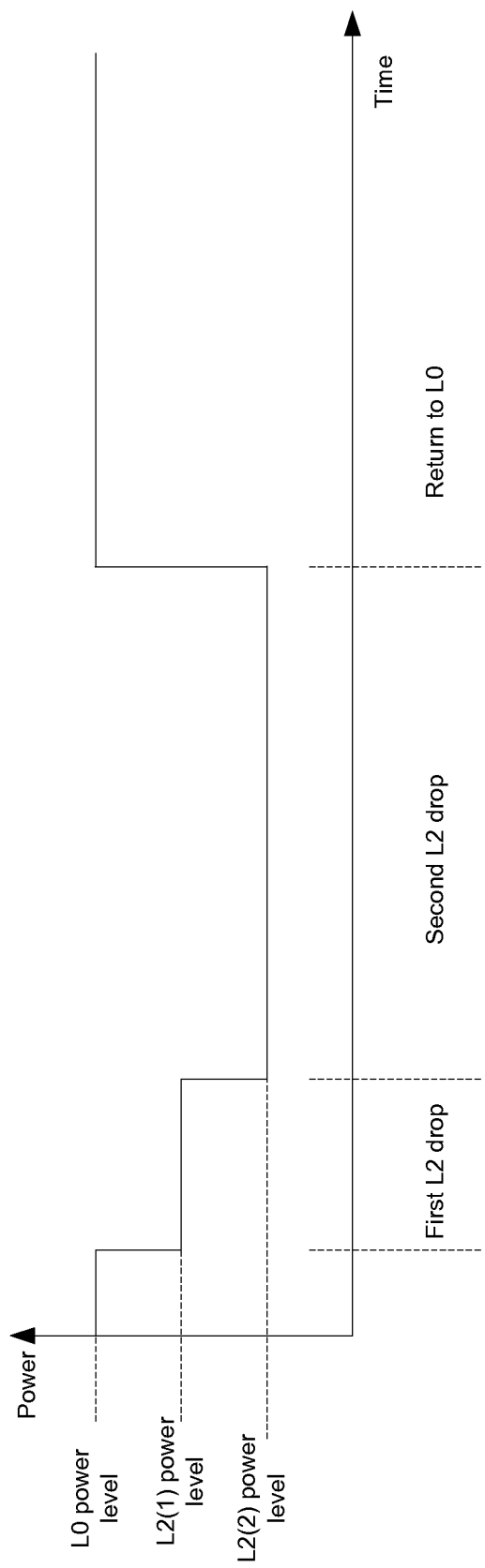
FIG. 2 shows an example of power consumption versus time in a continuous transmission mode.

FIG. 2 shows an example of power consumption versus time in a continuous transmission mode, which may be used by e.g., an ADSL2 transmitter. Suppose the ADSL2 transmitter initially operates in a full on mode (L0). If a user payload rate drops, the transmitter first transitions to a low power mode (L2) by reducing a power of transmission. Then, when the user payload rate continues to drop, the transmitter further reduces the power of transmission. In the L2 mode, even though the transmitting power is lowered, the transmitting path including analog front end (AFE) and line driver (LD) are kept on. Thus, power is still being consumed continuously. Then, when the transmitter is transitioned back to the full on state, power consumption rises again.

Disclosed herein are systems and methods to provide a discontinuous transmission or receiving mode for improved power saving in a DSL system. A DMT superframe in the discontinuous mode comprises a sync frame and at least one data frame. The DMT superframe may be transmitted by a transmitter over a time duration, which is longer a sum of a time duration of the sync frame and the at least one data frame. The time duration of the DMT superframe includes an OFF time duration, which is represented by one or more muted frames. Compared with existing continuous modes, the discontinuous mode disclosed herein may enable additional power savings by switching off certain digital and analog hardware blocks during the OFF time of the DMT superframe. In an embodiment, an AFE and/or a LD may be turned off during the OFF time. An extent of power savings may depend upon vendor specific implementation. If desired, a DMT superframe may further comprise a number of transition frames. In implementation, a DSL transceiver may go through an initiation stage, which is followed by a showtime stage. The disclosed discontinuous mode may maintain backward compatibility with existing modems, thus facilitating incorporation into an existing DSL standard (e.g., VDSL2) or a future DSL standard (e.g., G.fast).

Figure 3:
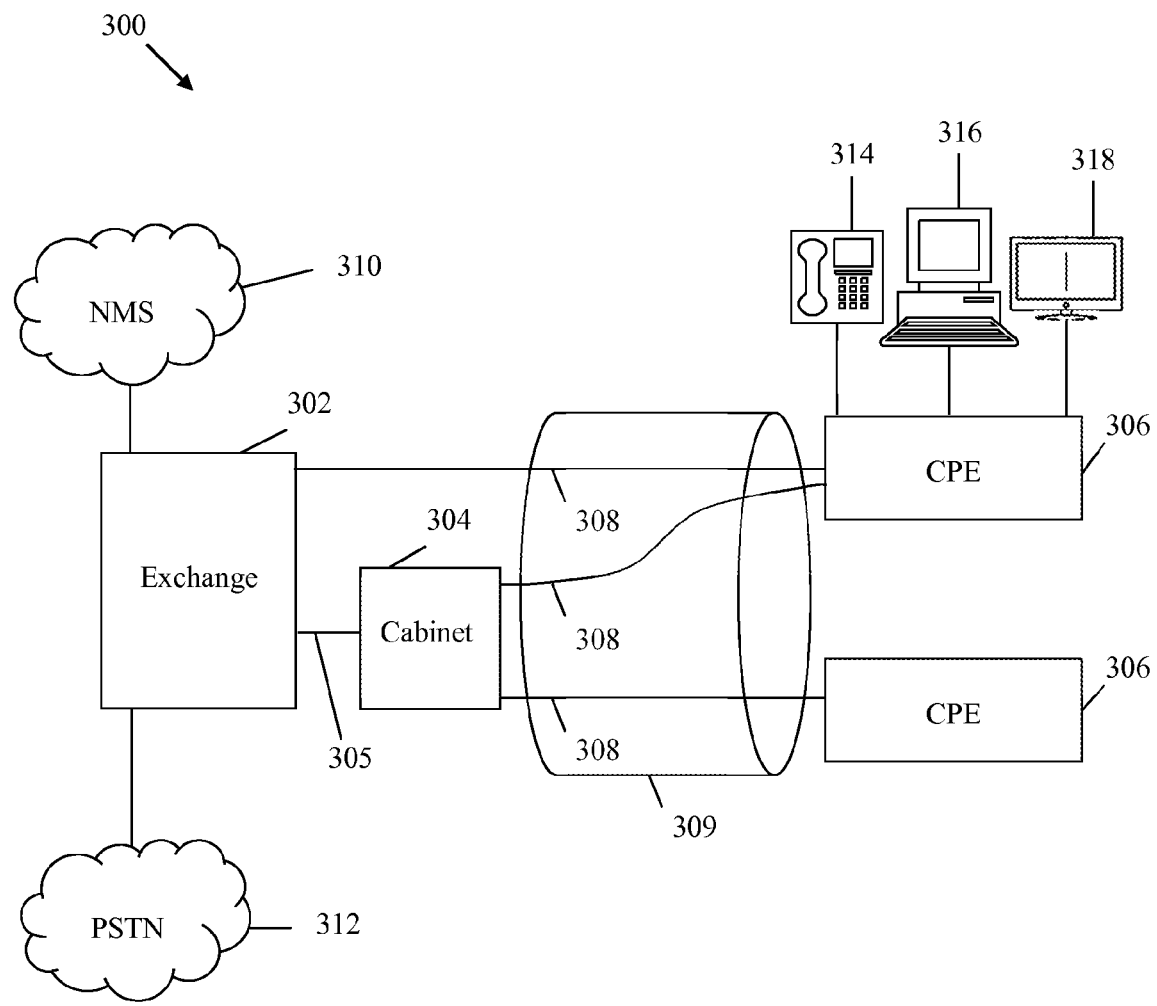
FIG. 3 is a schematic diagram of an embodiment of a DSL system.

FIG. 3 is a schematic diagram of an embodiment of a DSL system 300, wherein a disclosed discontinuous mode may be implemented. The DSL system 300 may be an ADSL2 system, an ADSL2+ system, a VDSL2 system, or any other DSL system (e.g., systems to be defined by ITU-T G.hn or G.fast standards). The DSL system 300 may comprise an exchange 302, a cabinet 304 coupled to the exchange 302 by a cable 305, and a plurality of customer premises equipment (CPEs) 306, which may be coupled to the exchange 302 and/or the cabinet 304 via a plurality of subscriber lines 308. The subscriber lines 308 may be made of any suitable material such as copper wire or optical fiber. At least some of the subscriber lines 308 may be bundled in a binder 309. Additionally, the DSL system 300 may optionally comprise a network management system (NMS) 310 and a public switched telephone network (PSTN) 312, both of which may be coupled to the exchange 302. In other embodiments, the DSL system 300 may be modified to include splitters, filters, management entities, and various other hardware, software, and functionality.

The NMS 310 may be a network management infrastructure that processes data exchanged with the exchange 302 and may be coupled to one or more broadband networks, such as the Internet. The PSTN 312 may be a network that generates, processes, and receives voice or other voice-band signals. In an embodiment, the exchange 302 may be a server located at a central office (CO) and may comprise switches and/or splitters, which may couple the NMS 310, the PSTN 312, and the subscriber lines 308. For instance, the splitter may be a 2:1 coupler that forwards data signals received from the subscriber lines 308 to the NMS 310 and the PSTN 312, and forwards data signals received from the NMS 310 and the PSTN 312 to the subscriber lines 308. Further, the splitter may optionally comprise one or more filters to help direct data signals between the NMS 310, the PSTN 312, and the subscriber lines 308. Additionally, the exchange 302 may comprise at least one DSL transmitter/receiver (transceiver), which may exchange signals between the NMS 310, the PSTN 312, and the subscriber lines 308. The signals may be received and transmitted using the DSL transceiver such as a modem. In an embodiment, the DSL transceiver may comprise a forward error correction (FEC) codeword generator that generates FEC data, an interleaver that interleaves the transmitted data across a plurality of sub-carriers, or both. For instance, the DSL transceiver may use a discrete multi-tone (DMT) line code that allocates a plurality of bits for each sub-carrier or tone in each symbol. The DMT may be adjusted to various channel conditions that may occur at each end of a subscriber line. In an embodiment, the DSL transceiver of the exchange 302 may be configured to transmit data at similar or different rates for each subscriber line 308.

In an embodiment, the cabinet 304 may be located at a distribution center between the CO and customer premises and may comprise switches and/or splitters, which may couple the exchange 302 to the CPEs 306. For instance, the cabinet 304 may comprise a DSL access multiplexer (DSLAM) that couples the exchange 302 to the CPEs 306. Additionally, the cabinet 304 may comprise one or more DSL transceivers, which may be used to exchange signals between the exchange 302 and the CPEs 306. The one or more DSL transceivers may process the received signals or may simply pass the received signals between the CPEs 306 and the exchange 302. The splitter in the cabinet 304 may be a N:1 coupler (where N is an integer) that routes data signals received from the exchange 302 to N CPEs 306, and routes data signals received from the N CPEs 306 to the exchange 302. The data signals may be transmitted and received using the DSL transceiver. Further, the splitter of the cabinet 304 may optionally comprise one or more filters to help direct data signals between the exchange 302 and the CPEs 306 via the corresponding subscriber lines 308. In an embodiment, the DSL transceiver may be configured to transmit data to the CPEs 306 at similar or different rates and/or power for each subscriber line 308. The cabinet 304 may also be referred to herein as a remote terminal (RT) interchangeably. In implementation, the exchange 302 (or the cabinet 304) may comprise a plurality of transceivers, and a central management entity (e.g., a processor) located in the exchange 302 (or the cabinet 304) may be configured to manage the plurality of transceivers, e.g., by controlling their transmission/receiving modes.

Depending on the supported standard, the DSL system 300 may be referred to as an xDSL system, where 'x' may indicate a DSL standard. For instance, 'x' stands for 'A' in ADSL2 or ADSL2+ systems, and 'x' stands for 'V' in VDSL or VDSL2 systems. When a transceiver in the DSL system 300 is located in a CO, the transceiver may be referred to as an xTU-C. In practice, as long as the transceiver is located at an operator end of the DSL system or loop (including a CO, exchange, or cabinet), it may be referred to as an xTU-C. On the other hand, when a transceiver in the DSL system 300 is located at a remote or user end such as a customer premise, the transceiver may be referred to as an xTU-R. For example, if the DSL system 300 is a VDSL2 system, a CO transceiver may then be referred to as a VDSL2 transceiver unit (VTU) at an optical network unit (VTU-O). The term VTU-O is sometimes also referred to as a VTU at a central office (VTU-C). In the VDSL2 system, a CPE transceiver may be referred to as a VTU at a remote terminal (VTU-R).

In an embodiment, the CPEs 306 may be located at the customer premises, where at least some of the CPEs 306 may be coupled to a telephone 314, a computer 316, and/or a television 318. The telephone 314 may be hardware, software, firmware, or combinations thereof that generates, processes, and receives voice or other voice-band signals. The CPE 306 may comprise a switch and/or a splitter, which may couple the subscriber lines 308 and the telephone 314, the computer 316, and the television 318. The CPE 306 may also comprise a DSL transceiver to exchange data between the CPE 306 and the exchange 302 via the subscriber line 308. For instance, the splitter may be a 2:1 coupler that forwards data signals received from the subscriber line 308 to the telephone 314 and the DSL transceiver, and forwards data signals received from the telephone 314 and the DSL transceiver to the subscriber line 308. The splitter may optionally comprise one or more filters to help direct data signals to and from the telephone 314 and the DSL transceiver. The DSL transceiver (e.g., a modem), may transmit and receive signals through the subscriber lines 308. For instance, the DSL transceiver may process the received signals to obtain the transmitted data from the exchange 302, and pass the received data to any of the telephone 314, the computer 316, and the television 318. The CPEs 306 may be coupled to the exchange 302 directly via the subscriber lines 308 and/or via the subscriber lines 308 and the cabinet 304. For example any of the CPEs 306 may be coupled to a subscriber line 308 from the exchange 302 and/or a subscriber line 308 from the cabinet 304. The CPEs 306 may access the NMS 310, the PSTN 312, and/or other coupled networks via the subscriber lines 308 deployed by the exchange 302 and/or the cabinet 304.

Figure 4:
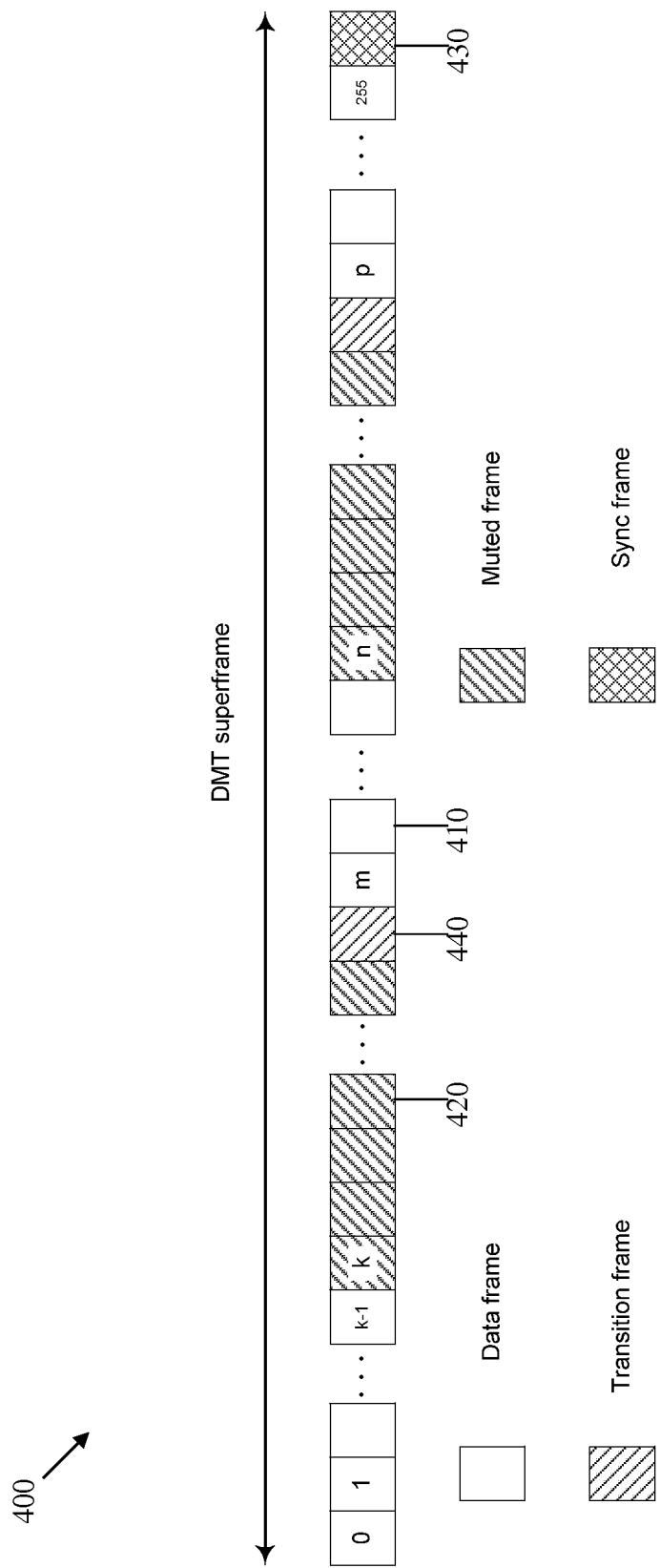
FIG. 4 is a diagram of an embodiment of a DMT superframe in a discontinuous mode.

FIG. 4 is a diagram of an embodiment of a DMT superframe 400 in a discontinuous mode. In the upstream direction, the DMT superframe 400 may be transmitted from an xTU-R and received by an xTU-C, while in the downstream direction, the DMT superframe 400 may be transmitted from an xTU-C and received by an xTU-R. The DMT superframe 400 may comprise one or more data frames (e.g., data frame 410), at least one muted frame (e.g., muted frame 420), and a sync frame 430. Optionally, the DMT superframe 400 may further comprise one or more transition frames (e.g., data frame 440). As shown in FIG. 4, each data frame (DF) is indicated by an unfilled box, each muted frame (MF) indicated by upward hatching, each transition frame (TF) indicated by downward hatching, and the sync frame 430 indicated by cross-hatching.

Each frame of the DMT superframe 400 comprises an ordered grouping of bits or bytes. To transmit a frame, the frame may be modulated onto a DMT symbol by a DMT modulator, and the DMT symbol may then be transmitted during a symbol time period. Thus, the disclosed discontinuous mode may be referred to as a symbol-gated discontinuous mode. There are data symbols, sync symbols, and transition symbols corresponding to data frames, sync frames, and transition frames respectively. In the interest of conciseness, transmission of a DMT symbol carrying a frame may simply be referred to herein as transmission of the frame.

A frame structure of the DMT superframe 400 is application dependent. As shown in FIG. 4, in the VDSL2 standard, the superframe 400 may comprise one sync frame and 256 other types of frames with positions or indexes ranging from 0 to 255 (i.e., [0, 255]). Data frames are located in positions [0, k−1], [m, n−1], and [p, 255], where k, m, n, and p are integers with k<m<n<p. In use, the number of data frames may be chosen to satisfy a user payload and overhead rate requirements. Thus, depending on the user payload or data rate, a valid range of the number of data frames within the superframe 400 may be [1, 255].

The muted frames 420 are located in positions [k, m−2] and [n, p−2] as shown in FIG. 4. The muted frames 420 may be virtual frames used herein to represent a temporal gap, during which transmission is turned off. Thus, no data or signal is actually transmitted in the muted frames 420. In the superframe 400, a number of the muted frames 420 may proportionally correlate to a length of off or down time. In an embodiment, during the gap period, a DSL transmitter is configured to turn off certain digital and/or analog hardware blocks or modules such as an AFE and/or a LD. Further, if the DMT superframe 400 is received by a DSL receiver, during a gap period represented by the muted frames 420, the DSL receiver may also be configured to turn off at least a portion of its modules, such as an AFE. Compared with a conventional continuous mode which keeps the AFE and LD on even in a low power state, the disclosed discontinuous mode may achieve greater power savings on both the transmitter and receiver ends.

The transition frames 440 may be located in positions [m-1] and [p-1] as shown in FIG. 4. The transition frames 440 may be used to help bring the DSL transmitter to a steady state, as well as to provide a preamble for receiver resynchronization. Therefore, the use of transition frames or symbols is vendor discretionary. If either the transmitter or receiver requires it, transition frames should be used. A number of transition frames may depend on analog transition characteristics of the transmitter and receiver, e.g., the time it takes for them to transition from an off state to a steady state. The transition frames may allow robustness and flexibility across different implementations. However, if the transition to the steady state occurs quickly for both the transmitter and receiver, the transition frames may not be needed. In this case, muted frames may be directly followed by data frames.

In an embodiment, the DMT superframe 400 may be constructed using a plurality of repeated sequences or cadences. Each cadence includes an ON period and an OFF period. The ON period may comprise a number of data frames, while the OFF period may comprise a number of muted frames and possibly one or more transition frames. The transition frames are included in the OFF period since they do not carry any user data. In an embodiment, one transition frame is included in each cadence except possibly a last cadence of the DMT superframe 400. Each cadence, except possibly the last cadence, may comprise an equal number of frames. Since the last cadence of the DMT superframe 400 may not have an equal number of frames with one or more preceding cadences, the last cadence may sometimes include only data frame(s), or sometimes include data frame(s) and muted frames. The last cadence is followed by the sync frame 430. The sync frame 430 may provide a time marker for on-line reconfiguration (OLR), thus its content may depend on whether timing for OLR is being signaled. For instance, the sync frame 430 may comprise all zeros or all ones, which may be used by a DSL transmitter and receiver for synchronization purposes.

In the VDSL2 standard, a transmission or receiving duration of the DMT superframe 400 in a discontinuous mode may be the same with a transmission or receiving duration of the DMT superframe 100 in a continuous mode. Any position of the 256 frames may locate a data frame, a muted frame, or a transition frame. In use, the numbers and positions of data frames, transition frames, and muted frames may be negotiated between two modems. Although 257 frames (including one sync frame) is shown in FIG. 4 to demonstrate a DMT superframe structure in VDSL2, it should be noted that, in another DSL standard, the DMT superframe 400 may comprise any other suitable number of frames and may be constructed similarly.

If a user payload rate changes, the DMT superframe 400 may be reconfigured accordingly to meet the payload rate requirement while achieving maximal power savings. In an embodiment, to meet an increased payload rate, the number of data frames in each cadence of the DMT superframe 400 may be increased, while the number of muted frames reduced. Similarly, to meet a decreased payload rate, the number of data frames in each cadence of the DMT superframe 400 may be reduced, while the number of muted frames increased. Further, the number of cadences may also be changed when necessary. For example, the DMT superframe 400 may be configured to include only one cadence comprising one data frame, if the user payload rate is quite low. If a DSL transceiver is working in a power saving mode for a subscriber line, the transceiver may be connected to the subscriber line at a highest data rate according to line conditions during an initialization stage. In this way, after the transceiver enters showtime stage, more data frames may be muted in the discontinuous mode, and greater power savings may be achieved.

Figure 5:
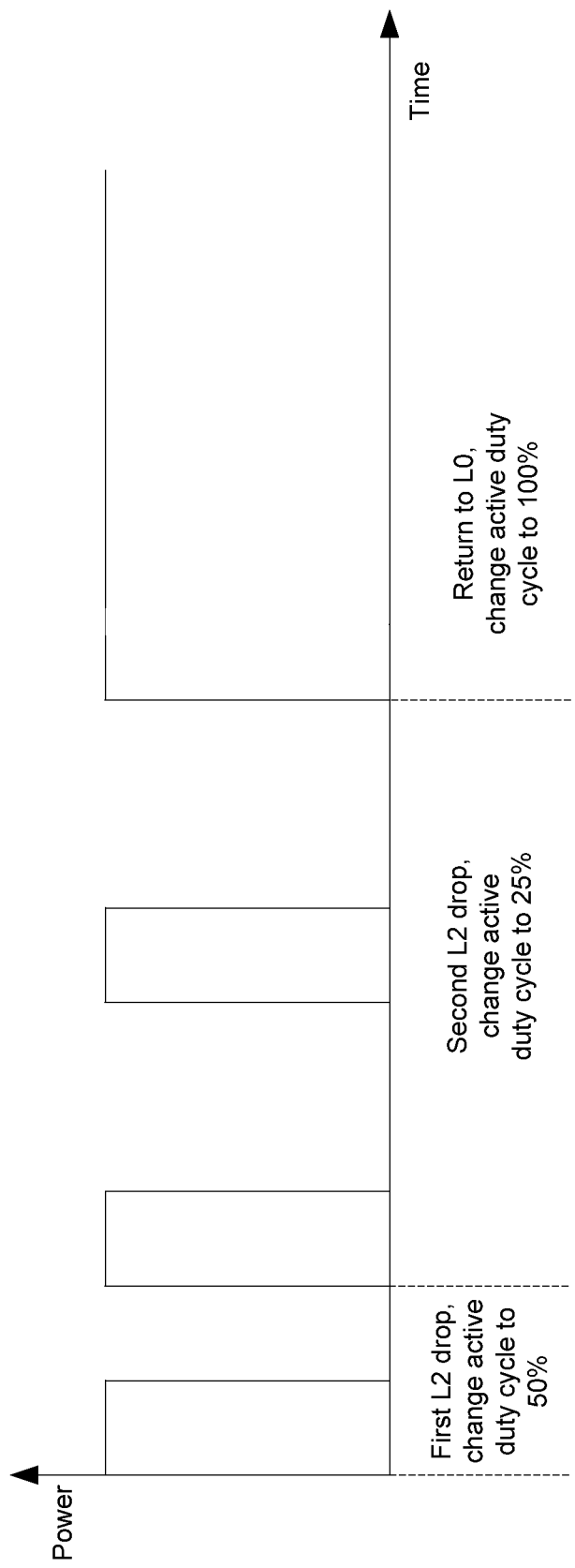
FIG. 5 shows an example of power consumption versus time in a discontinuous mode.

FIG. 5 shows an example of power consumption versus time in a discontinuous mode. Suppose a DSL transmitter initially operates in a full on mode (L0), which is a continuous transmission mode. If a user payload rate drops, the transmitter may transition to a power saving mode (denoted as L2) by switching from the continuous transmission mode to a discontinuous transmission mode. In this example, an active duty cycle of a DMT superframe, which refers to the number of data frames over the total number of a DMT superframe, is set to 50% first. Thus, during the active duty cycle, the transmitting path is kept on, while during the de-active duty cycle (50%), the transmitting path is turned off. Compared with, e.g., the L2 mode in ADSL2, which lowers the transmitting power but keeps AFE and LD on, the discontinuous mode may completely turn off the AFE and LD. Thus, little to no power may be consumed in the de-active duty cycle (e.g., during a period of muted frames). Since the AFE and line driver may consume a significant portion of total power, the discontinuous mode may lead to significant extra saving of average power over time. As shown in FIG. 5, if the active duty cycle is further changed to 25%, the average power consumption over time may be further lowered. Then, when the transmitter is transitioned back to the full on state by changing the active duty cycle to 100%, power consumption may rise again.

In practice, to reconfigure a DMT superframe from a continuous mode to a discontinuous mode, two sets of information may need to be modified. Firstly, a new superframe allocation map (including numbers and locations of the DF, TF, and MF symbols) may be defined in a discontinuous showtime parameter descriptor. Secondly, a new set of parameters (such as Lp, Dp, Tp, Gp, Bp0, etc.) may be defined in a mux data frame (MDF). In use, the ability to reconfigure MDF parameters may ensure compliance to configured overhead rates, delay, impulse noise protection (INP), etc. Configuration and reconfiguration of a DMT superframe are further described in paragraphs below.

A discontinuous mode may be utilized in a showtime phase of a DSL system when it is supported by both xTU-C and xTU-R. In use, a DSL transceiver may go through an initialization process before entering the showtime phase. For example, in the VDSL2 standard, the initialization process may comprise four phases including a handshake phase, a channel discovery phase, a training phase, and a channel analysis and exchange phase. To support the discontinuous mode, the four phases may remain similar, except that certain messages exchanged between two transceivers (e.g., a VTU-O and a VTU-R) may be modified, which will be described in paragraphs below.

Detailed procedures of the handshake phase are described in the ITU-T Recommendation G.994.1 entitled "Handshake Procedures for Digital Subscriber Line (DSL) Transceivers", which is incorporated herein by reference. The detailed procedures in G.994.1 may be applicable to VDSL2 or another DSL standard. During the handshake phase, two transceivers (e.g., a VTU-O and a VTU-R) may perform a variety of transactions to exchange and negotiate capabilities as well as select a mode of operation. For example, in a basic transaction identified as transaction A in G.994.1, the xTU-R selects a mode of operation by sending a mode select (MS) message to the xTU-C. Upon receiving of the MS message, if the xTU-C grants the mode of operation, it may respond with an acknowledgement type 1 message, denoted as ACK(1). Then, both transceivers may transition to the selected mode. For another example, in a basic transaction identified as transaction C in G.994.1, capabilities are exchanged and negotiated by the two transceivers. The xTU-R sends a capabilities list request (CLR) message. The xTU-C responds by sending a capability list (CL) message, which conveys a list of possible modes of operation of the xTU-C. Then, the xTU-R completes the transaction C by sending a ACK(1) message. The transaction C may be followed by the transaction A, transaction B, or transaction D during the same session to select a common mode of operation identified during the capabilities exchange. In a basic transaction, the xTU-R may control the negotiation procedure.

On the other hand, the VTU-O may control the negotiation procedure in an extended transaction, which is derived from a concatenation of two basic transactions. For example, in an extended transaction identified as transaction A:C in G.994.1, the xTU-R selects a mode of operation by sending a mode select (MS) message to the xTU-C. However, rather than responding to the MS message with an ACK(1) message as is the case for basic transaction A, the xTU-C responds with a request CLR (REQ-CLR) message requesting the xTU-R to proceed directly into basic transaction C without returning to the initial transaction state.

In use, capabilities in upstream and downstream directions may be indicated by 2 code points in a standard information field of CL/CLR/MS messages. The standard information field may be denoted as Npar(2), which signifies a level 2 parameter that has no subparameters associated with it. In an embodiment, the Npar(2) comprises two octets denoted as Octet1 and Octet2. NPar(2) Octet1, as shown in Table 1, may be the same with the Npar(2) defined in Table 11.67 of G.994.1, which includes only one octet. Definitions of notations and parameters used in Table 1 and other tables herein, such as PSD, US0, FEXT, UPBO, are included in ITU-T Recommendations G.993.2 or G.994.1.

In the present disclosure, the NPar(2) Octet2, as shown in Table 2, is an extra octet added to G.994.1, so that discontinuous mode capabilities may be signaled in upstream and downstream directions. In the NPar(2) Octet2, if Bit 1 is set to '1' (sometimes written herein as ONE), it may signify that a discontinuous showtime mode is supported in the upstream direction. Similarly, if Bit 2 is set to '1', it may signify that a discontinuous showtime mode is supported in the downstream direction. When Bit 1 and Bit 2 are set to '1', both the xTU-C and the xTU-R support discontinuous modes.

TABLE 1

Standard information field - NPar(2) Octet1 coding

| Bits | | | | | | | | G.993.2 NPar(2) Octet1 |
|---|---|---|---|---|---|---|---|---|
| 8 | 7 | 6 | 5 | 4 | 3 | 2 | 1 | |
| x | x | x | x | x | x | x | 1 | All-digital mode |
| x | x | x | x | x | x | 1 | x | Support of downstream virtual noise |
| x | x | x | x | x | 1 | x | x | Lineprobe |
| x | x | x | x | 1 | x | x | x | Loop diagnostic mode |
| x | x | x | 1 | x | x | x | x | Support of PSD shaping in US0 |
| x | x | 1 | x | x | x | x | x | Support of equalized FEXT UPBO |
| x | x | 0 | 0 | 0 | 0 | 0 | 0 | No parameters in this octet |

TABLE 2

Standard information field - NPar(2) Octet2 coding

| Bits | | | | | | | | G.993.2 NPar(2) Octet2 |
|---|---|---|---|---|---|---|---|---|
| 8 | 7 | 6 | 5 | 4 | 3 | 2 | 1 | |
| x | x | x | x | x | X | x | 1 | Support of discontinuous showtime mode upstream |
| x | x | x | x | x | X | 1 | X | Support of discontinuous showtime mode downstream |
| x | x | x | x | x | 0 | x | X | Reserved |
| x | x | x | x | 0 | X | x | X | Reserved |
| x | x | x | 0 | x | X | x | X | Reserved |
| x | x | 0 | x | x | X | x | X | Reserved |
| x | x | 0 | 0 | 0 | 0 | 0 | 0 | No parameters in this octet |

The NPar(2) Octet1 and Octet2 may be part of CL/CLR/MS messages exchanged between the xTU-C and the xTU-R. Table 3 shows bit definitions of the NPar(2) when it is included in a CL message sent by a VTU-O (in VDSL2). The first six bit definitions are for Octet1, which may be same with Table 12-3 of G.993.2, and the last two bit definitions are for Octet2.

TABLE 3

VTU-O CL message NPar(2) bit definitions

| G.994.1 NPar(2) Bit | Definition of NPar(2) bits |
|---|---|
| All-digital mode | If set to ONE, signifies that the VTU-O supports all-digital mode. |
| Support of downstream virtual noise | If set to ONE, signifies that the VTU-O supports the use of the downstream virtual noise mechanism. |
| Lineprobe | Always set to ONE in a VTU-O CL message. |
| Loop diagnostic mode | Set to ONE if the VTU-O requests loop diagnostic mode. |
| Support of PSD shaping in US0 | Always set to ONE in a VTU-O CL message. |
| Support of equalized FEXT UPBO | If set to ONE, signifies that the VTU-O supports equalized FEXT UPBO. |
| Support of discontinuous showtime mode upstream | If set to ONE, signifies that the VTU-O supports discontinuous showtime mode in upstream direction |
| Support of discontinuous showtime mode downstream | If set to ONE, signifies that the VTU-O supports discontinuous showtime mode in downstream direction |

Similarly, Table 4 shows bit definitions of the NPar(2) when it is included in a MS message sent by a VTU-O (in VDSL2). The first six bit definitions are for Octet1, which may be same with Table 12-6 of G.993.2, and the last two bit definitions are for Octet2. The discontinuous showtime mode may be enabled in the MS message only if both the VTU-O and the VTU-R have indicated the capability of this mode in previous CL and/or CLR messages.

TABLE 4

VTU-O MS message NPar(2) bit definitions

| G.994.1 NPar(2) Bit | Definition of NPar(2) bits |
|---|---|
| All-digital mode | Set to ONE if and only if both the last previous CLR and the last previous CL messages have set this bit to ONE. If set to ONE, indicates that both the VTU-O and the VTU-R shall be configured for operation in all-digital mode. |
| Support of downstream virtual noise | Set to ONE if and only if both the last previous CLR and the last previous CL messages have set this bit to ONE. Indicates that the downstream virtual noise mechanism may be used. |
| Lineprobe | Set to ONE if and only if both the last previous CLR and the last previous CL messages have set this bit to ONE. Indicates that the channel discovery phase of initialization shall include a lineprobe stage. |
| Loop diagnostic mode | Set to ONE if either the last previous CLR or the last previous CL message has set this bit to ONE. Indicates that both VTUs shall enter loop diagnostic mode. |
| Support of PSD shaping in US0 | Set to ONE if and only if both the last previous CLR and the last previous CL messages have set this bit to ONE. Indicates that the VTU-R supports PSD shaping in the US0 band. |
| Support of equalized FEXT UPBO | Set to ONE if and only if both the last previous CLR and the last previous CL messages have set this bit to ONE. Indicates that both the VTU-O and the VTU-R shall use equalized FEXT UPBO. |
| Support of discontinuous showtime mode upstream | Set to ONE if and only if both the last previous CLR and the last previous CL messages have set this bit to ONE. Indicates that both the VTU-O and the VTU-R shall use discontinuous showtime mode in upstream. |
| Support of discontinuous showtime mode downstream | Set to ONE if and only if both the last previous CLR and the last previous CL messages have set this bit to ONE. Indicates that both the VTU-O and the VTU-R shall use discontinuous showtime mode in downstream. |

Similarly, Table 5 shows bit definitions of the NPar(2) when it is included in a CLR message sent by a VTU-R (in VDSL2). The first six bit definitions are for Octet1, which may be same with Table 12-9 of G.993.2, and the last two bit definitions are for Octet2.

TABLE 5

VTU-R CLR message NPar(2) bit definitions

| G.994.1 NPar(2) Bit | Definition of NPar(2) bits |
|---|---|
| All-digital mode | If set to ONE, signifies that the VTU-R supports all-digital mode. |
| Support of downstream virtual noise | If set to ONE, signifies that the VTU-R supports the use of the downstream virtual noise mechanism. |
| Lineprobe | Set to ONE if the VTU-R requests the inclusion of a lineprobe stage in initialization. |
| Loop Diagnostic mode | Set to ONE if the VTU-R requests loop diagnostic mode. |
| Support of PSD shaping in US0 | If set to ONE, signifies that the VTU-R supports PSD shaping in the US0 band. |
| Support of equalized FEXT | If set to ONE, signifies that the VTU-R supports equalized FEXT UPBO. |
| Support of discontinuous showtime mode upstream | If set to ONE, signifies that the VTU-R supports Discontinuous Showtime mode in upstream. |
| Support of discontinuous showtime mode downstream | If set to ONE, signifies that the VTU-R supports Discontinuous Showtime mode in downstream. |

Table 6 shows bit definitions of the NPar(2) when it is included in a MS message sent by a VTU-R (in VDSL2). The first six bit definitions are for Octet1, which may be same with Table 12-12 of G.993.2, and the last two bit definitions are for Octet2. The discontinuous showtime mode may be enabled in the MS message only if both the VTU-O and the VTU-R have indicated the capability of this mode in previous CL and/or CLR messages.

TABLE 6

VTU-R MS message NPar(2) bit definitions

| G.994.1 NPar(2) Bit | Definition of NPar(2) bits |
|---|---|
| All-digital mode | Set to ONE if and only if both the last previous CLR and the last previous CL messages have set this bit to ONE. If set to ONE, indicates that both the VTU-O and the VTU-R shall be configured for operation in all-digital mode. |
| Support of downstream virtual noise | Set to ONE if and only if both the last previous CLR and the last previous CL messages have set this bit to ONE. Indicates that the downstream virtual noise mechanism may be used. |
| Lineprobe | Set to ONE if and only if both the last previous CLR and the last previous CL messages have set this bit to ONE. Indicates that the channel discovery phase of initialization shall include a lineprobe stage. |
| Loop Diagnostic mode | Set to ONE if either the last previous CLR or the last previous CL message has set this bit to ONE. Indicates that both VTUs shall enter loop diagnostic mode. |

TABLE 6-continued

VTU-R MS message NPar(2) bit definitions

| G.994.1 NPar(2) Bit | Definition of NPar(2) bits |
|---|---|
| Support of PSD shaping in US0 | Set to ONE if and only if both the last previous CLR and the last previous CL messages have set this bit to ONE. Indicates that the VTU-R shall support PSD shaping in the US0 band. |
| Support of equalized FEXT | Set to ONE if and only if both the last previous CLR and the last previous CL messages have set this bit to ONE. Indicates that both the VTU-O and the VTU-R shall use equalized FEXT UPBO. |
| Support of discontinuous showtime mode upstream | Set to ONE if and only if both the last previous CLR and the last previous CL messages have set this bit to ONE. Indicates that both the VTU-O and the VTU-R shall use discontinuous showtime mode in upstream,. |
| Support of discontinuous showtime mode downstream | Set to ONE if and only if both the last previous CLR and the last previous CL messages have set this bit to ONE. Indicates that both the VTU-O and the VTU-R shall use discontinuous showtime mode in downstream,. |

After completion of the handshake phase, the initialization process may proceed to the channel discovery phase, the training phase, and the channel analysis and exchange phase. In the channel analysis and exchange phase, the VTU-O may send an O-PMS (physical media specific message from VTU-O) message to the VTU-R. The O-PMS message may convey initial physical media specific-transmission convergence (PMS-TC) parameter settings that shall be used in the upstream direction during showtime. Likewise, the VTU-R may send an R-PMS (PMS from VTU-R) message to the VTU-O. The R-PMS message may convey initial PMS-TC parameter settings that shall be used in the downstream direction during showtime. In an embodiment, if during the preceding handshake phase, both VTUs have agreed to the new symbol-gated discontinuous mode, then the O-PMS and R-PMS messages may be modified to include a discontinuous showtime parameter field.

Table 7 shows an embodiment of a list of parameters carried by an O-PMS message, which may comprise 16 parameter fields. Field number (#) 1 to Field #15 of the O-PMS message may be the same with an O-PMS message defined in Table 12-49 of G.993.2. Thus, detailed definitions and notations of these fields can be found in G.993.2. For example, Field #2 "MSGLP" denotes a one-byte field that indicates which latency path is selected for overhead (OH) frames of a Type 1 message (which carries message overhead) in the upstream direction.

In an embodiment, Field #16 is a discontinuous showtime parameter field which specifies parameters used in a discontinuous showtime mode in the upstream direction. The discontinuous showtime parameter field may comprise four octets.

TABLE 7

Description of message O-PMS

| Field number | Field name | Format |
|---|---|---|
| 1 | Message descriptor | Message code |
| 2 | MSGLP (NOTE 1) | 1 byte |
| 3 | Mapping of bearer channels to latency paths | 1 byte |
| 4 | $B_{x0}$ | 1 byte |
| 5 | $B_{x1}$ | 1 byte |
| 6 | LP0 (NOTE 2) | Latency path descriptor |
| 7 | $LP_1$ | Latency path descriptor |
| 8 | max_delay_octet$_{DS, 0}$ | 3 bytes |
| 9 | max_delay_octet$_{DS, 1}$ | 3 bytes |
| 10 | max_delay_octet$_{US, 0}$ | 3 bytes |

TABLE 7-continued

Description of message O-PMS

| Field number | Field name | Format |
|---|---|---|
| 11 | max_delay_octet$_{US, 1}$ | 3 bytes |
| 12 | Upstream SOS tone groups | Band descriptor |
| 13 | Upstream ROC parameters | ROC descriptor |
| 14 | G.998.4 parameter field | Variable length |
| 15 | G.993.5 parameter field | Variable length |
| 16 | Discontinuous showtime parameter field | 4 bytes |

(NOTE 1)
If the ROC is enabled, MSGLP shall be equal to 0.
(NOTE 2)
If the ROC is enabled, the framing parameters for latency path #0 shall be contained in the ROC descriptor.

Table 8 shows an embodiment of a list of parameters carried by an R-PMS message, which may comprise 13 parameter fields. Field #1 to Field #12 of the R-PMS message may be the same with an R-PMS message defined in Table 12-57 of G.993.2. Thus, detailed definitions and notations of these fields can be found in G.993.2. In an embodiment, Field #13 is a discontinuous showtime parameter field which specifies parameters used in a discontinuous showtime mode in the downstream direction. The discontinuous showtime parameter field may comprise four octets.

TABLE 8

Description of message R-PMS

| Field # | Field name | Format |
|---|---|---|
| 1 | Message descriptor | Message code |
| 2 | MSGLP (NOTE 1) | 1 byte |
| 3 | Mapping of bearer channels to latency paths | 1 byte |
| 4 | $B_{x0}$ | 1 byte |
| 5 | $B_{x1}$ | 1 byte |
| 6 | $LP_0$ (NOTE 2) | Latency path descriptor |
| 7 | $LP_1$ | Latency path descriptor |
| 8 | Erasure decoding used | 1 byte |
| 9 | Downstream SOS tone groups | Band descriptor |
| 10 | Downstream ROC parameters | ROC descriptor |
| 11 | G.998.4 parameter field | Variable length |
| 12 | G.993.5 parameter field | Variable length |
| 13 | Discontinuous showtime parameter field | 4 bytes |

(NOTE 1)
If the ROC is enabled, MSGLP shall be equal to 0.
(NOTE 2)
If the ROC is enabled, the framing parameters for latency path #0 shall be contained in the ROC descriptor.

Whether used as Field #16 of an O-PMS message or as Field #13 of an R-PMS message, the discontinuous showtime parameter field may share the same format. Table 9 shows an embodiment of a discontinuous showtime parameter field, which may define a cadence structure of a DMT superframe. Every cadence in the DMT superframe may comprise an ON period (sometimes also referred to as an ON cadence) and an OFF period (sometimes also referred to as an OFF cadence). The ON period may include a number of data frames, while the OFF period may include a number of muted frames. If desired, the OFF period may further include a number of transition frames.

The discontinuous showtime parameter field may comprise four octets (Octet 1 to Octet 4). Octet 1 may specify a number of data frames in every ON period of a cadence. In an embodiment, valid values of the number of data frames may reside in the range 1-255. Octet 2 may specify a number of OFF frames (i.e., transition frames plus muted frames) in every OFF period of the cadence. In an embodiment, valid values of the number of OFF frames may reside in the range 0-255. Octet 3 may specify a number of transition frames in every OFF period of the cadence in a downstream (denoted as DS) superframe. In an embodiment, valid values of the number of transition frames may be zero or one. Octet 4 may specify a number of transition frames in every OFF period of the cadence in an upstream (denoted as US) superframe. In an embodiment, valid values of the number of transition frames may be zero or one. It should be noted that a last cadence in a superframe may have a different structure from the other cadences of the superframe, as there may not be enough frame positions left for the last cadence.

Suppose, for example, that the DMT superframe comprises D data frames, where D is an integer greater than one. In this case, a time duration of the superframe is equal to at least a sum of the time duration of the sync frame and a time duration of D+M data frames, where M is a positive integer indicating a portion of the time duration of the super frame, during which some components of the transmitter is turned off. Further, depending on octet values of the discontinuous showtime parameter field, there may be one or more cadences in the time duration of the DMT superframe.

The discontinuous showtime parameter field may define a first cadence of the one or more cadences. For example, Octet1 may indicate a number of data frames in the first on period, and Octet2 may indicate a duration of the first off period, which is represented by muted frames (and transition frames if any). If there are one or more transition frames used in the DMT superframe, Octet3 and/or Octet4 may indicate a number of transition frame transmitted in the first off period. In an embodiment, Octet3 is intended for a downstream direction, and Octet4 is intended for an upstream direction. In an embodiment, during transmission of the DMT superframe a structure of the first cadence (i.e., number of data frames in the on period and duration of the off period) may be repeated until the time duration of the superframe is completed.

Further, after being defined in the discontinuous showtime parameter field, the same cadence structure may be repeated in every DMT superframe. DMT superframes transmitted in the upstream and downstream directions may have a same or different cadence structure.

TABLE 9

Description of a discontinuous showtime parameter field

| Octet | Field | Format | Description |
| --- | --- | --- | --- |
| 1 | ON Period | 1 byte | The number of DF in every ON period. Valid values [1-255] |
| 2 | OFF Period | 1 byte | The number of MF + TF in every OFF period. Valid values [0-255]. |
| 3 | DS TF request | 1 byte | The number of TF in every OFF period in a downstream superframe. Valid values 0 and 1. |
| 4 | US TF request | 1 byte | The number of TF in every OFF period in an upstream superframe. Valid values 0 and 1. |

Figure 6:
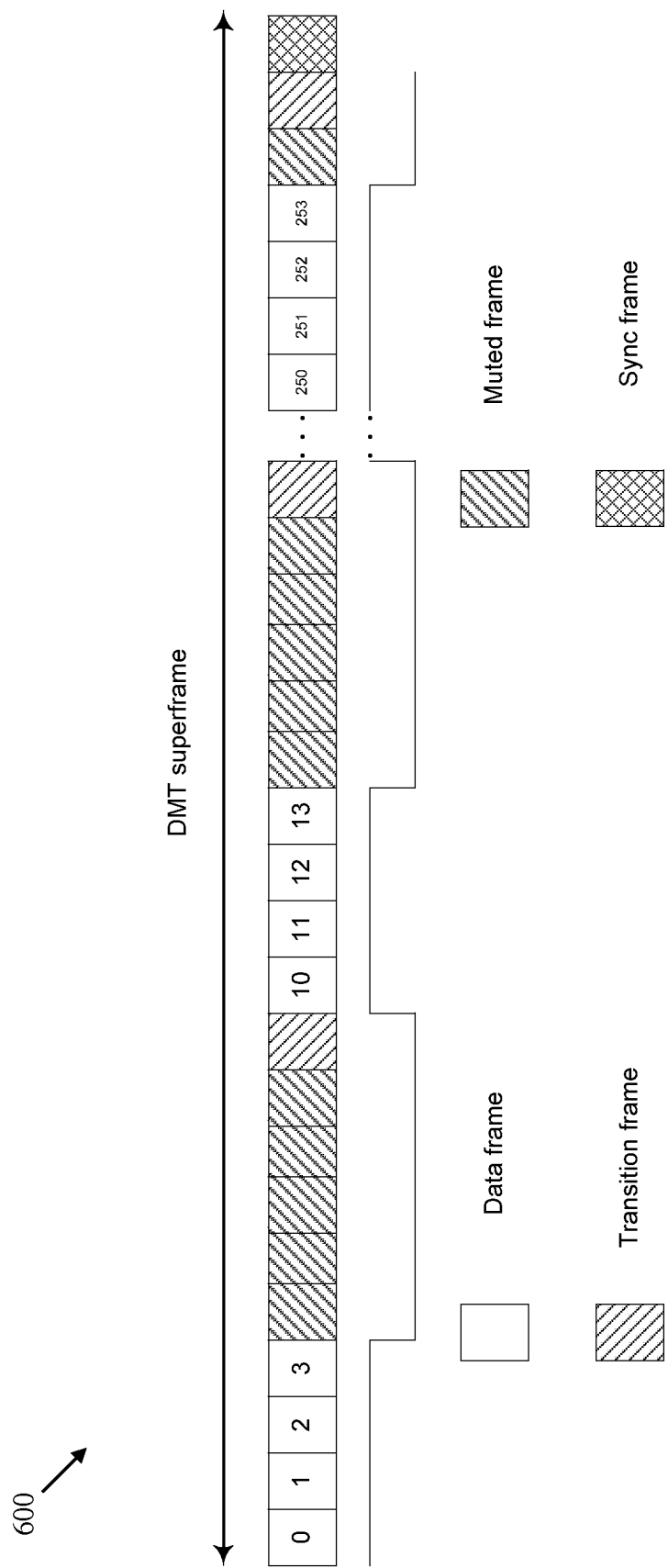
FIG. 6 is a diagram of an embodiment of a DMT superframe in a discontinuous mode.

FIG. 6 is a diagram of an embodiment of a DMT superframe 600 in a discontinuous mode, which is a specific example of the DMT superframe 400. The DMT superframe 600 comprises one sync frame (with index 256) and 256 other frames with indexes ranging from 0 to 255. The DMT superframe 600 comprises 26 cadences, wherein each of the first 25 cadences comprises 4 data frames, 5 muted frames, and 1 transition frame. Thus, the first 250 frames (from frame 0 to frame 249) of the DMT superframe 600 is equally divided. The 26th cadence has only 6 frames (instead of 10) comprising 4 data frames, 1 muted frame, and 1 transition frame.

To change a level of power consumption in the discontinuous showtime mode, the cadence structure may be altered. In an embodiment, altering of the cadence structure may be realized by modifying the discontinuous showtime parameter field defined in Table 9. For example, to meet an increased payload rate, the number of data frames in the first 25 cadences of the DMT superframe 600 may be increased to 7, while the number of muted frames reduced to 1. Similarly, to meet a decreased payload rate, the number of data frames in the first 25 cadences of the DMT superframe 600 may be reduced to 1, while the number of muted frames increased to 10. Further, if neither a transmitter nor receiver requires a transition frame, it may be removed from each cadence of the DMT superframe 600.

In addition, modifying the discontinuous showtime parameter field may also allow a transceiver to exit the discontinuous mode. For example, the transceiver may be transitioned from the discontinuous mode to a continuous mode by setting parameters: ON-Cadence=256, OFF-Cadence=0, Transition Symbols=0. With these parameters, a 257-frame superframe (e.g., superframe 100 in FIG. 1) may contain 1 sync frame and 256 data frames.

Although only a portion of necessary procedures in the initialization process are described herein, it should be understood that other phases and procedures may be implemented and other messages may be exchanged between two VTUs to complete the initialization process. Detailed description of all steps may be found in standard documents, thus they are not further discussed herein in the interest of conciseness. After completing the initialization process, both an xTU-C and an xTU-R may enter the showtime phase, during which a discontinuous mode may be used.

The present disclosure may support on-line reconfiguration (OLR) in the discontinuous mode. OLR may be used by a transceiver to adapt to changes in operating conditions by reconfiguration of parameters (e.g., tone group, data rate, PMS-TC parameters, etc.) without interrupting service, introducing errors, or changing latency. During showtime, an OLR request may be initiated by either xTU-O or xTU-R. In an embodiment, OLR commands are used in the discontinuous mode to realize various types of OLR operations including bit swapping (BS), seamless rate adaptation (SRA), save our showtime (SOS), and discontinuous showtime reconfiguration (DSR). The DSR may be a new OLR type added to the existing three OLR types.

Table 10 shows an embodiment of OLR commands including OLR Requests Type 1 to Type 7. In Table 10, $N_{TG\text{-}PM}$ denotes a number of power management tone groups, and $N_{LP}$ denotes a number of active latency paths. Definitions of other variables, such as $L_0$, $L_1$, $D_0$, $D_1$, $L_p$, $T_p$, $G_p$, $B_{p0}$, $msg_p$, $D_p$ etc., may be found in the G.992.3 or G.993.2 Recommendation. Requests Type 1 to Type 6 have been defined in Table 11-5 of G.993.2. In an embodiment, Request Type 7 fulfills DSR by altering at least one of the parameters specified in Table 9. The Request Type 7 may comprise 13 octets (octet 1 to octet 13) containing parameters of the discontinuous mode.

After OLR, the change of one or more parameters may become effective on a next OH superframe boundary. If an interleaver depth is changed, parameter changes may be implemented according to the procedure as defined in section 9.4.1 of G.993.2.

TABLE 10

OLR commands sent by the initiating VTU

| Name | Length (octets) | Octet number | Content | Support |
|---|---|---|---|---|
| Request Type 1 | $5 + 4 \times N_f$ ($N_f \leq 128$) | 2 | $04_{16}$ (Note 1) | Mandatory |
| | | 3 to 4 | 2 octets for the number of sub-carriers $N_f$ to be modified | |
| | | 5 to $4 + 4 \times N_f$ | $4 \times N_f$ octets describing the sub-carrier parameter field for each sub-carrier | |
| | | $5 + 4 \times N_f$ | 1 octet for SC | |
| Request Type 2 | For further study | 2 | $05_{16}$ (Note 1) | For further study |
| | | All others | Reserved by ITU-T | |
| Request Type 3 (SRA) (Note 6) | $5 + 7 N_{LP} + 4 N_f$ ($N_f \leq 128$) | 2 | $06_{16}$ (Note 1) | Optional |
| | | 3 to $2 + 2 N_{LP}$ | $2 \times N_{LP}$ octets containing the new $L_p$ values for each of the active latency paths ($N_{LP}$ = number of active latency paths) (Notes 2 and 3) | |
| | | $3 + 2 N_{LP}$ to $2 + 4 N_{LP}$ | $2 \times N_{LP}$ octets containing the new $D_p$ values for each of the active latency paths ($N_{LP}$ = number of active latency paths) (Note 4) | |
| | | $3 + 4 N_{LP}$ to $2 + 5 N_{LP}$ | $N_{LP}$ octets containing the new $T_p$ values for each of the active latency paths ($N_{LP}$ = number of active latency paths) (Notes 2, 3, 5) | |
| | | $3 + 5 N_{LP}$ to $2 + 6 N_{LP}$ | $N_{LP}$ octets containing the new $G_p$ values for each of the active latency paths ($N_{LP}$ = number of active latency paths) (Notes 2, 3, 5) | |
| | | $3 + 6 N_{LP}$ to $2 + 7 N_{LP}$ | $N_{LP}$ octets containing the new $B_{p0}$ values for each of the active latency paths ($N_{LP}$ = number of active latency paths) (Notes 2, 3, 5) | |
| | | $3 + 7 N_{LP}$ to $4 + 7 N_{LP}$ | 2 octets for the number of sub-carriers $N_f$ to be modified | |
| | | $5 + 7 N_{LP}$ to $4 + 7 N_{LP} + 4 N_f$ | $4 N_f$ octets describing the sub-carrier parameter field for each sub-carrier | |
| | | $5 + 7 N_{LP} + 4 N_f$ | 1 octet for Segment Code (SC) | |
| Request Type 4 (SOS) | $N_{TG}/2 + 11$ | 2 | $07_{16}$ (NOTE 1) | |
| | | 3 | Message ID | |
| | | 4 to $N_{TG}/2 + 3$ | $\Delta b(2)$ $\Delta b(1)$ $\Delta b(4)$ $\Delta b(3)$ ... $\Delta b(N_{TG})$ $\Delta b(N_{TG}) - 1)$ | |
| | | $N_{TG}/2 + 4$ to $N_{TG}/2 + 5$ | New value for $L_0$ | |
| | | $N_{TG}/2 + 6$ to $N_{TG}/2 + 7$ | New value for $L_1$ | |
| | | $N_{TG}/2 + 8$ to $N_{TG}/2 + 9$ | New value for $D_0$ | |
| | | $N_{TG}/2 + 10$ to $N_{TG}/2 + 11$ | New value for $D_1$ | |

TABLE 10-continued

OLR commands sent by the initiating VTU

| Name | Length (octets) | Octet number | Content | Support |
|---|---|---|---|---|
| Request Type 5 (SRA/G.998.4) | See G.998.4 | 2<br>All others | $08_{16}$ (NOTE 1)<br>Reserved for G.998.4 | Optional |
| Request Type 6 (SOS/G.998.4) | See G.998.4 | 2<br>All others | $09_{16}$ (NOTE 1)<br>Reserved for G.998.4 | Optional |
| Request Type 7 (DSR) | 13 | 2<br>3<br>4<br>5<br>6<br>7<br>8<br>9<br>10<br>11<br>12 | $0A_{16}$ (NOTE 1)<br>Downstream(0)/upstream(1)<br>ON Cadence<br>OFF Cadence<br>Transition Symbols<br>$B_{p0}$<br>$B_{p1}$<br>$T_{p0}$<br>$T_{p1}$<br>$G_{p0}$<br>$G_{p1}$ | |

(NOTE 1)
All other values for octet number 2 are reserved by ITU-T.
(NOTE 2)
For this command, any change in Lp, Tp, Gp, and Bp0 values shall be such that the length of the MDF (as defined in Table 9-6) remains unchanged for all active latency paths.
(NOTE 3)
To keep the msgp value within its valid range for relatively large changes of Lp, it may be necessary to change all of the Tp, Gp, and Bp0 values.
(NOTE 4)
If a change of Dp is not supported, the value of this parameter shall be identical to that currently used.
(NOTE 5)
If a change of Tp, Gp and Bp0 is not supported, the values of these parameters shall be identical to those currently used.
(NOTE 6)
When $N_{LP}$ = 2, the octets associated with latency path 0 are sent first.
(NOTE 7)
LP0 and LP1 are latency path descriptors. If ROC is enabled, then the parameter values are bounded by the values specified in the ROC descriptor
(NOTE 8)
The value of L will not be changed i.e. kept same as current value before OLR request The discontinuous mode may be initiated or changed by either a CO transceiver or a CPE transceiver. In an embodiment, the Request Type 7 is sent by a CO transceiver and received by a CPE transceiver. After receiving the discontinuous mode request, the CPE transceiver may grant or reject the request. For example, if the discontinuous mode request is for the downstream direction, the CPE transceiver may grant the request by sending an ACK message as a response. If the discontinuous mode request is for the upstream direction, the CPE transceiver may grant the request by sending a sync flag (sometimes denoted as Syncflag) as a response. Table 11 shows discontinuous mode responses transmitted by the responding CPE, which may be similar to Table 11-21 of G.993.2.

TABLE 11

The discontinuous mode responses sent by the responding VTU

| Message length (Octets) | Element name (Command) |
|---|---|
| 2 | $80_{16}$ Grant |
| 3 | $85_{16}$ Reject followed by:<br>1 octet for reason code |

In an embodiment, for a discontinuous mode request in the downstream direction, the CO transceiver sends an OLR command of Request Type 7, which specifies cadence structure information and new framing parameters such as $T_p$, $G_p$ and $B_{p0}$. Then, the CPE transceiver may grant command by sending a grant response to CO. Next, the CO transceiver sends a Syncflag to complete the transaction. The change of downstream framing parameters $T_p$, $G_p$ and $B_{p0}$ may take effect on a first OH frame of a first OH superframe which follows the 66th DMT symbol after the Syncflag. The new on/off control shall take effect on the next superframe after the Syncflag.

In an embodiment, for a discontinuous mode request in the upstream direction, the CO transceiver sends an OLR command of Request Type 7, which specifies cadence structure information and new framing parameters such as $T_p$, $G_p$ and $B_{p0}$. Then, the CPE transceiver may respond with a Syncflag to complete the transaction. The change of upstream framing parameters $T_p$, $G_p$ and $B_{p0}$ shall take effect on the first OH frame of the first OH superframe that follows the 66th DMT symbol after the Syncflag. The new on/off control shall take effect on the next superframe after the Syncflag.

After receiving the discontinuous mode request from the CO transceiver, the CPE transceiver may defer or reject the discontinuous mode request by sending a negative acknowledge (NACK) message, which includes a reason of rejection. Table 12 shows a variety of types of NACK messages. As shown in Table 12, rejection responses including Defer Type 1 Request, Reject Type 2-6 Requests, and intermediate acknowledge (IACK) may be the same with Table 11-6 of G.993.2. Reject Type 7 Request is added herein to respond to the Request Type 7.

TABLE 12

OLR responses sent by the responding VTU

| Name | Length (octets) | Octet number | Content | Support |
|---|---|---|---|---|
| Defer Type 1 Request | 3 | 2<br>3 | $81_{16}$<br>1 octet for reason code | Mandatory |

TABLE 12-continued

OLR responses sent by the responding VTU

| Name | Length (octets) | Octet number | Content | Support |
|---|---|---|---|---|
| Reject Type 2 Request | 3 | 2<br>3 | $82_{16}$<br>1 octet for reason code | For further study |
| Reject Type 3 Request | 3 | 2<br>3 | $83_{16}$<br>1 octet for reason code | Optional |
| Reject Type 4 Request | 3 | 2<br>3 | $84_{16}$<br>1 octet for reason code | Optional |
| Reject Type 5 Request | 3 | 2<br>3 | $85_{16}$<br>1 octet for reason code | Optional |
| Reject Type 6 Request | 3 | 2<br>3 | $86_{16}$<br>1 octet for reason code | Optional |
| Reject Type 7 Request | 3 | 2<br>3 | $87_{16}$ (Note)<br>1 octet for reason code | Optional |
| IACK | 3 | 2<br>3 | $8B_{16}$ (Note)<br>1 octet for SC | Mandatory |

(NOTE)
All other values for octet number 2 are reserved by ITU-T.

As shown in Table 12, each rejection response comprises an octet to convey a reason of rejection. Table 13 shows two reason codes which can be used in various rejection responses. A "yes" indicates that the reason code is applicable to a corresponding reject type, while a "no" indicates that the reason code is not applicable to the corresponding reject type. Applicability of the reason code for Defer Type 1 Request and Reject Type 2-4 Requests may be the same with Table 11-7 in G.993.2. In an embodiment, both busy and invalid parameter reasons are applicable to the Reject Type 7 Request.

TABLE 13

Reason codes for OLR responses

| Reason | Octet value | Applicable to Defer Type 1 | Applicable to Reject Type 2 | Applicable to Reject Type 3 | Applicable to Reject Type 4 | Applicable to Reject Type 7 |
|---|---|---|---|---|---|---|
| Busy | $01_{16}$ | yes | yes | yes | no | yes |
| Invalid parameters | $02_{16}$ | yes | yes | yes | yes | yes |

Sometimes, mode transitions may also cause time-varying crosstalk between subscriber lines in a binder. For example, the time-varying crosstalk may be caused by transitioning from a discontinuous mode to a continuous mode, or vice versa. The time-varying crosstalk may interfere with signal to noise ratio (SNR) measurement, which in turn leads to potential instability, retrains, and/or other undesirable consequences. To avoid this potential issue, if desired, additional rules may be applied on the DMT superframe structure in the discontinuous mode. In an embodiment, if a transceiver port is in the process of initialization, a central management entity (e.g., a CO or cabinet) may disable discontinuous modes for all ports. After the port completes initialization and reaches showtime, the discontinuous mode may be enabled. This guideline may ensure that the SNR measurement during the initialization process is accurate. In an embodiment, for all ports, some symbols in the discontinuous DMT superframe may be pre-assigned to always be DF or TF symbols. These symbols could then be used by all the ports to accurately measure the SNR in showtime. This guideline ensures that the SNR measurement for OLR and other algorithms is accurate.

Figure 7:
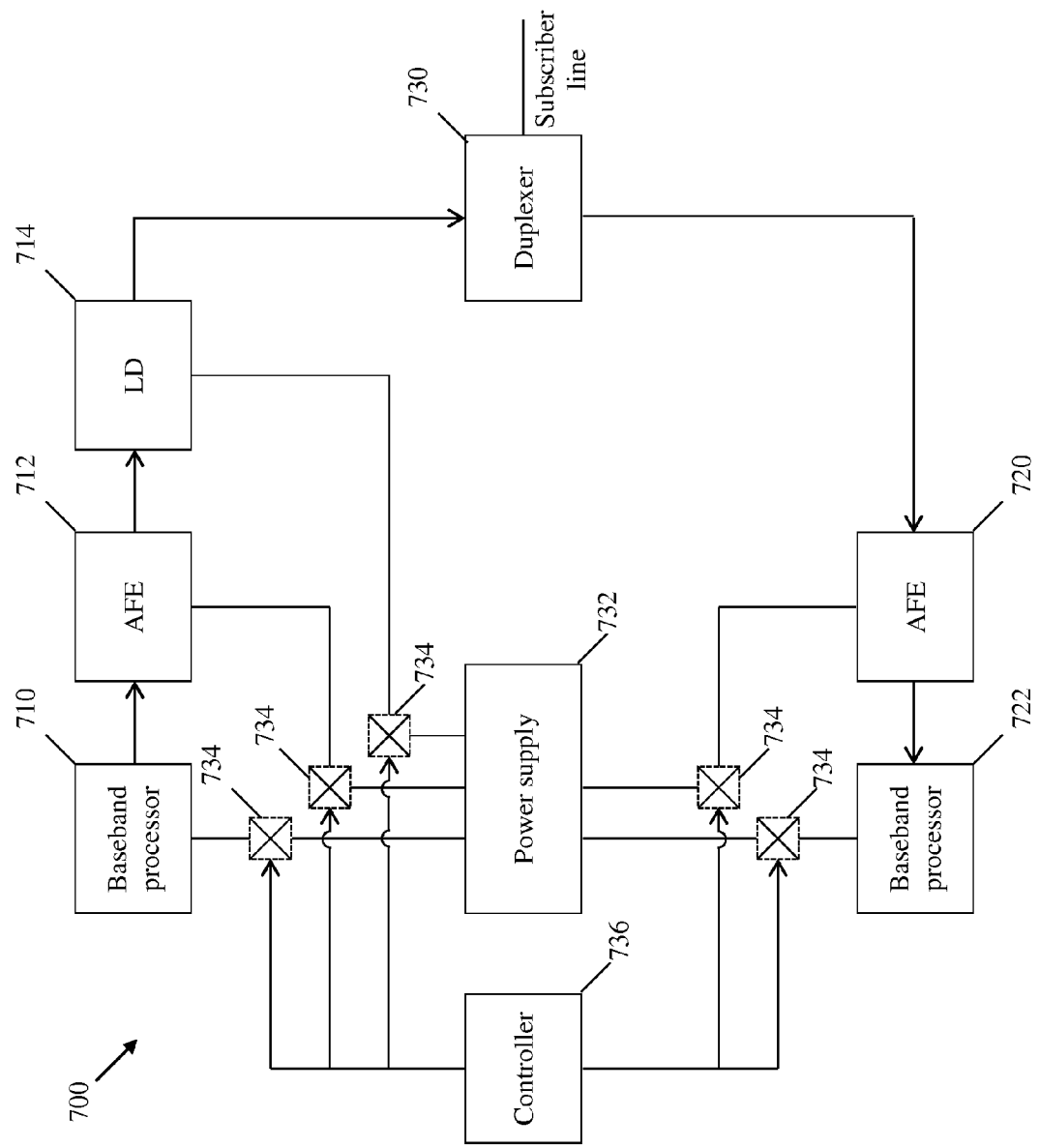
FIG. 7 is a schematic diagram of an embodiment of a DSL transceiver.

FIG. 7 illustrates an embodiment of a DSL transceiver 700, which may be included in the exchange 302, cabinet 304, and/or CPE 306 in FIG. 3 to implement a discontinuous transmission/receiving mode. The transceiver 700 may comprise a transmitter section and a receiver section. The transmitter section may comprise a baseband processor 710, an AFE 712, and a LD 714 arranged as shown in FIG. 7. The baseband processor 710 may process data and generate digital signals, which may then feed into the AFE 712. The AFE 712 may comprise units such as a digital-to-analog (D/A) converter configured to convert the digital signals into analog signals. The line driver 714 may comprise units such as a power amplifier configured to amplify the analog signals. An analog signal from the LD 714 comprising a DMT superframe (e.g., the DMT superframe 400 in FIG. 4) may further go through a duplexer 730 and then get transmitted to a subscriber line.

On the other hand, the receiver section may comprise an AFE 720 and a baseband processor 722 arranged as shown in FIG. 7. An analog signal comprising a DMT superframe (e.g., the DMT superframe 400 in FIG. 4) may be received by the duplexer 730 from a subscriber line. The AFE 720 may comprise units such as an analog-to-digital (A/D) converter configured to convert the analog signal into a digital signal, which may then be further processed by the baseband processor 722. In an embodiment, the baseband processor 722 may be a digital signal processor (DSP).

Components in the transmitter and receiver sections may further comprise a power supply 732 coupled to other components via switches 734, and a controller 736 configured to control the ON/OFF status of some or all of the switches 734. In an embodiment of a discontinuous transmission mode, the controller 736 may be configured to turn off the baseband processor 710, the AFE 712, the LD 714, or any combination thereof, during the OFF periods (represented by muted frames) of a symbol-gated DMT superframe. Turning off a component may be realized by opening a switch, and turning on a component may be realized by closing the switch. In an embodiment of a discontinuous receiving mode, the controller 736 may be configured to turn off the AFE 720, the baseband processor 722, or both, during the OFF periods (represented by muted frames) of a symbol-gated DMT superframe.

It should be noted that FIG. 7 may include only part of all components in a transceiver, thus other components, such as a modulator, demodulator, noise canceller, etc., may also be included separately, if they are not included in as functions of the baseband processor. In addition, arrangement of certain components may vary. For example, there may be a common baseband processor for the transmitter and receiver sections, in which case the baseband processor 710 and the baseband processor 720 may be the same. There may be a common switch controlling more than one component, in which case these components may be turned ON/OFF together.

Figure 8:
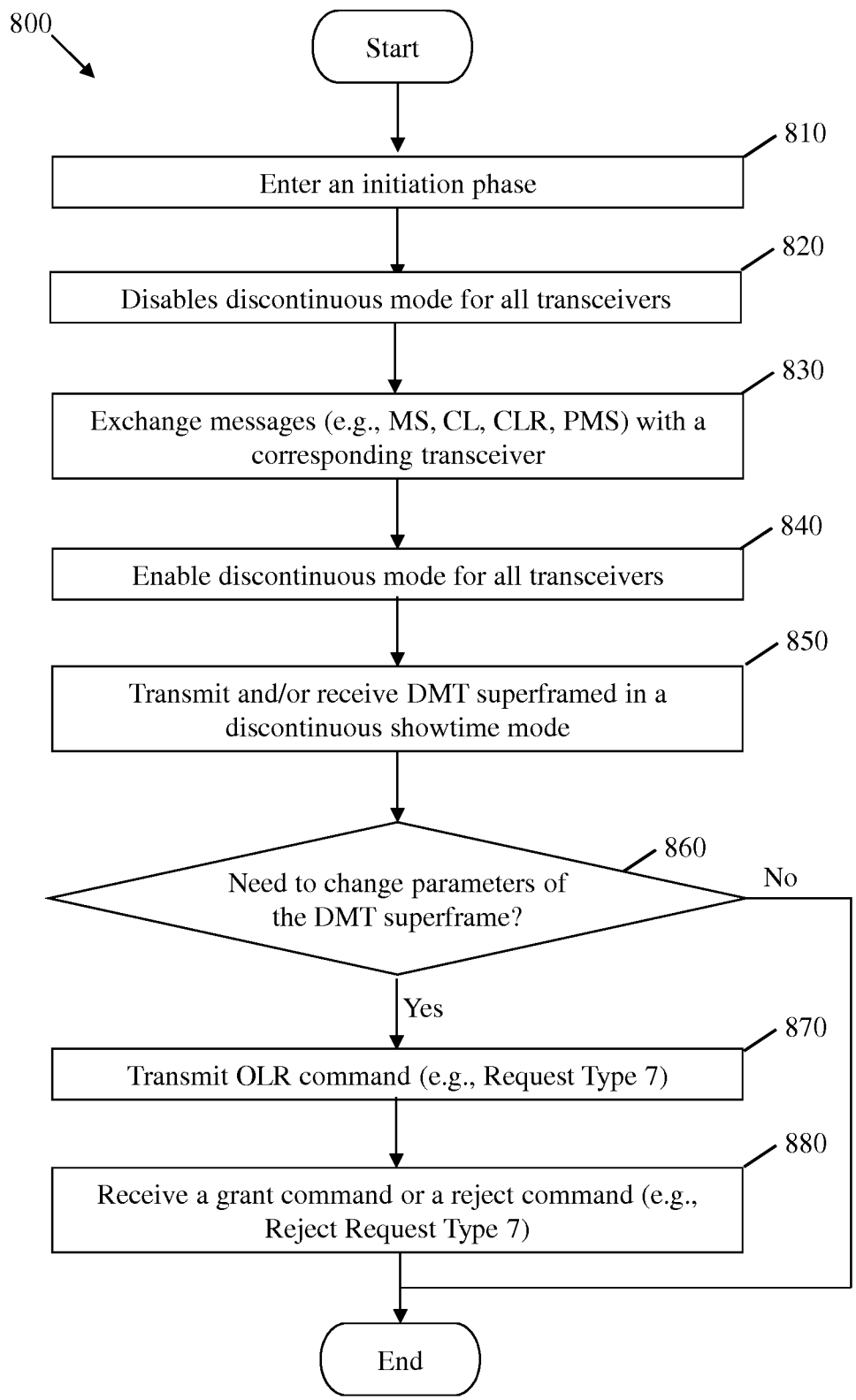
FIG. 8 is a flowchart of a discontinuous mode operation method.

FIG. 8 illustrates an embodiment of a discontinuous mode operation method 800, which may be implemented in a CPE, CO, exchange, or cabinet of a DSL system (e.g., the DSL system 100 in FIG. 1). The method 800 may start in step 810, where a transceiver may enter an initiation phase. Depending on a location of the transceiver, there may be no other transceivers (e.g., in a CPE), or a plurality of other transceivers coupled to a plurality of subscriber lines (e.g., in a CO, exchange, or cabinet). If the plurality of other transceivers exist, next, in step 820, a central management entity (e.g., a processor located in CO) may disable a discontinuous mode for all the transceivers. If no other transceiver exists, step 820 may be skipped. Next, in step 830, various messages may be exchanged between the transceiver and another transceiver located on another end of the DSL system. Exchanged messages may include, e.g., MS, CL, CLR, PMS messages, or any combination thereof. The support of a discontinuous mode may be negotiated between the two transceivers during the initiation phase.

Next, after finishing initiation, in step 840, the central management entity may enable the discontinuous mode for all transceivers present. If no other transceiver exists, step 840 may be skipped. Next, in step 850, the transceiver may transmit and/or receive DMT superframes in a discontinuous showtime mode. A DMT superframe may comprise a sync frame and at least one data frame. In an embodiment, a time duration of the DMT superframe in the discontinuous showtime mode is longer than a sum of a time duration of the sync frame and a time duration of the at least one data frame. The time duration of the DMT superframe includes one or more off periods, in which at least a portion of the transceiver may be turned off. The portion may include, e.g., an AFE, LD, baseband processor, other analog or digital components, or any combination thereof.

Next, in block 860, the method 800 may determine if parameters of the DMT superframe (e.g., number of data frame, muted frame, and/or transition frame in each on period of a cadence) needs to be changed. If the condition in the block 860 is met, the method 800 may proceed to step 870. Otherwise, the method 800 may end. In step 870, a transmitter section of the transceiver may send an OLR command such as a Request Type 7 to its corresponding transceiver. Next, in step 880, the transceiver may receive a discontinuous mode grant command, if its corresponding transceiver grants the parameter change. Then, the transceiver may change its DMT superframe parameters. Otherwise, in step 880, the transceiver may receive a reject command such as a Reject Request Type 7 with a reason code, if its corresponding transceiver does not grant the parameter change. In this case, the DMT superframe parameters may remain unchanged.

Figure 9:
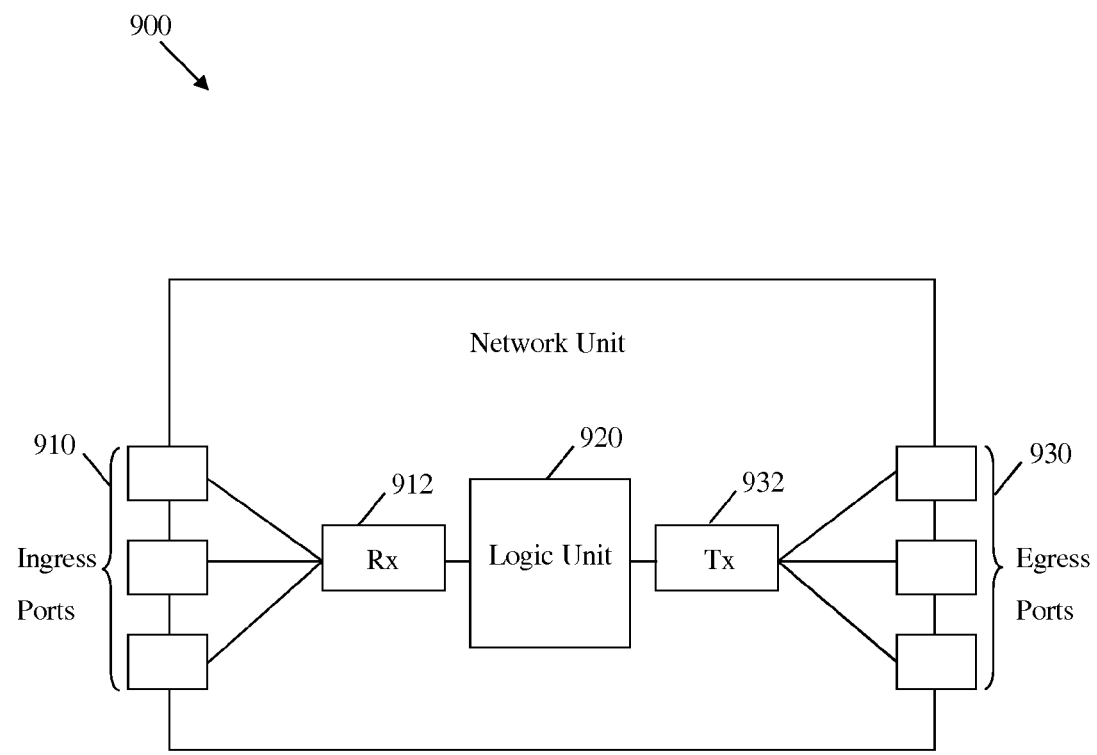
FIG. 9 is a schematic diagram of an embodiment of a network unit.

FIG. 9 illustrates an embodiment of a network unit 900, which may comprise, for example, a DSL transceiver as described above within a network or system. The network unit 900 may comprise a plurality of ingress ports 910 and/or receiver units (Rx) 912 for receiving data from other network units or components, logic unit or processor 920 to process data and determine which network unit to send the data to, and a plurality of egress ports 930 and/or transmitter units (Tx) 932 for transmitting data to the other network units. The logic unit or processor 920 may be configured to implement any of the schemes described herein, such as the discontinuous mode operation method 800. The logic unit 920 may be implemented using hardware, software, or both.

Figure 10:
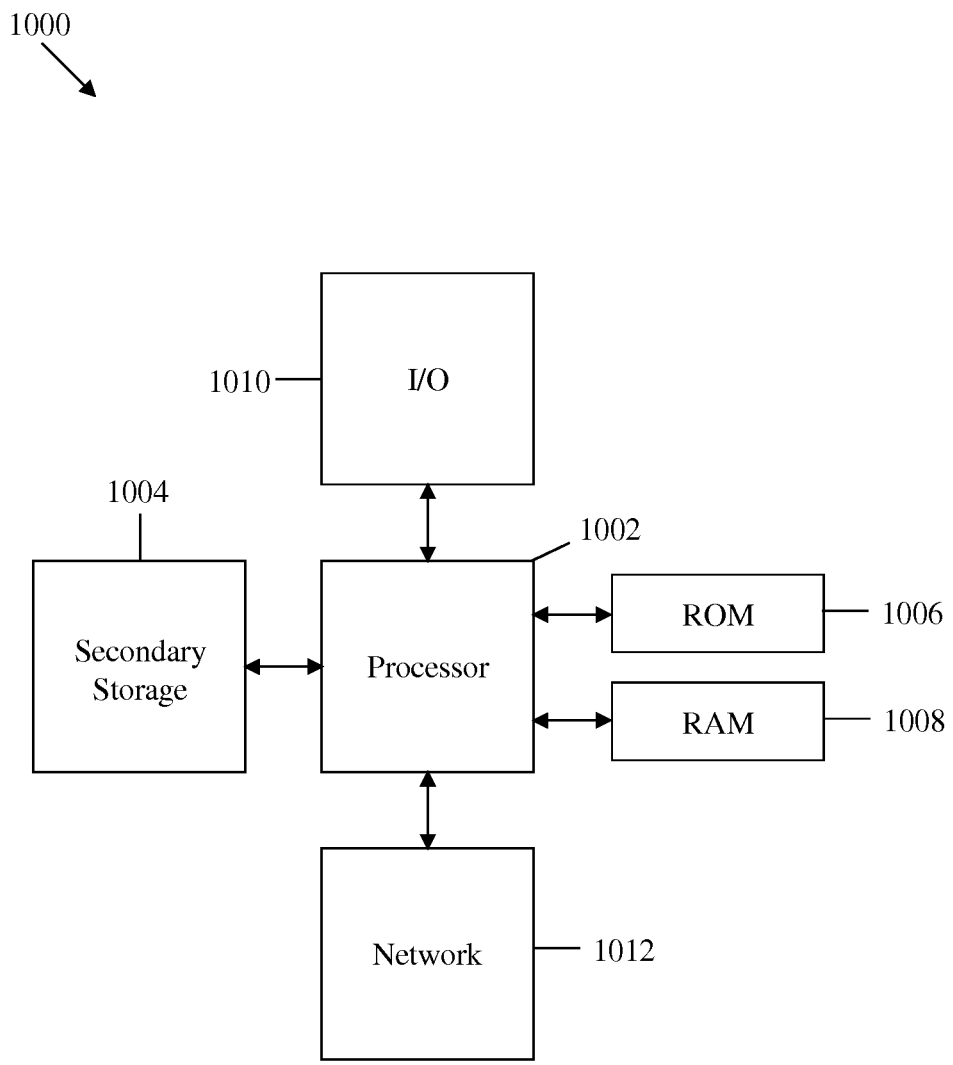
FIG. 10 is a schematic diagram of an embodiment of a typical, general-purpose computer system.

The schemes described above may be implemented on any general-purpose network component, such as a computer or network component with sufficient processing power, memory resources, and network throughput capability to handle the necessary workload placed upon it. FIG. 10 illustrates a schematic diagram of a typical, general-purpose network component or computer system 1000 suitable for implementing one or more embodiments of the methods disclosed herein, such as the discontinuous mode operation method 800. The general-purpose network component or computer system 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. Although illustrated as a single processor, the processor 1002 is not so limited and may comprise multiple processors. The processor 1002 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1002 may be configured to implement any of the schemes described herein, including the discontinuous mode operation method 800. The processor 1002 may be implemented using hardware, software, or both.

The secondary storage 1004 is typically comprised of one or more disk drives or tape drives and is used for non-volatile storage of data and as an over-flow data storage device if the RAM 1008 is not large enough to hold all working data. The secondary storage 1004 may be used to store programs that are loaded into the RAM 1008 when such programs are selected for execution. The ROM 1006 is used to store instructions and perhaps data that are read during program execution. The ROM 1006 is a non-volatile memory device that typically has a small memory capacity relative to the larger memory capacity of the secondary storage 1004. The RAM 1008 is used to store volatile data and perhaps to store instructions. Access to both the ROM 1006 and the RAM 1008 is typically faster than to the secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising a digital subscriber line (DSL) transmitter that comprises:
   an analog front end (AFE);
   a switch;
   a controller coupled to the switch and configured to control the switch; and
   a power supply coupled to the AFE via the switch,
   wherein the DSL transmitter is configured to:
      transmit a discrete multi-tone (DMT) superframe comprising a sync frame and a data frame, wherein a time duration of the superframe is equal to at least a sum of a time duration of the sync frame and twice a time duration of the data frame;
      turn off at least a portion of the DSL transmitter for a portion of the time duration of the superframe, wherein the portion of the time duration is no shorter than the duration of the data frame, wherein turning off the portion of the DSL transmitter includes disconnecting the AFE from the power supply by opening the switch; and
      keep the controller on for the portion of the time duration of the superframe.

2. The apparatus of claim 1, wherein the DSL transmitter further comprises a line driver (LD) coupled to the AFE and the power supply via a second switch, and wherein turning off the portion of the DSL transmitter includes disconnecting the LD from the power supply by opening the second switch.

3. The apparatus of claim 1, wherein the DSL transmitter is further configured to transmit a message comprising a standard information field denoted as Npar(2), wherein Npar(2) comprises an octet denoted as Octet2, wherein Octet2 comprises eight bits denoted as Bit 1 to Bit 8, wherein Bit 1 of Octet2 indicates whether the DSL transmitter supports a discontinuous showtime mode in an upstream direction, and wherein Bit 2 of Octet2 indicates whether the DSL transmitter supports the discontinuous showtime mode in a downstream direction.

4. The apparatus of claim 3, wherein the DSL transmitter supports the discontinuous showtime mode in the upstream direction if Bit 1 of Octet2 is set to one, and wherein the DSL transmitter supports the discontinuous showtime mode in the downstream direction if Bit 2 of Octet2 is set to one.

5. The apparatus of claim 3, wherein the DSL transmitter is located on an operator end of a DSL system, and wherein the message is a capability list (CL) message.

6. The apparatus of claim 3, wherein the DSL transmitter is located on an operator end of a DSL system, and wherein the message is a mode select (MS) message.

7. The apparatus of claim 3, wherein the DSL transmitter is located on a user end of a DSL system, and wherein the message is a mode select (MS) message.

8. The apparatus of claim 3, wherein the DSL transmitter is located on a user end of a DSL system, and wherein the message is a capabilities list request (CLR) message.

9. The apparatus of claim 1, wherein the DMT superframe comprises a plurality of data frames including the data frame, wherein a number of the plurality of data frames is denoted as D, wherein D is an integer greater than one, wherein the time duration of the superframe is equal to at least a sum of the time duration of the sync frame and a time duration of D+M data frames, and wherein M is a positive integer indicating the portion of the time duration of the superframe.

10. The apparatus of claim 9, wherein D+M is no greater than 256.

11. The apparatus of claim 9, wherein the DSL transmitter is used in a G.fast standard.

12. The apparatus of claim 1, wherein the DSL transmitter is further configured to transmit an on-line reconfiguration (OLR) command comprising a Request Type 7.

13. The apparatus of claim 12, further comprising a receiver configured to receive a discontinuous mode grant command or another OLR command comprising a Reject Request Type 7.

14. The apparatus of claim 1, wherein the DMT superframe comprises a plurality of data frames including the data frame, wherein the apparatus further comprises a plurality of DSL transmitters including the DSL transmitter, wherein each of the plurality of DSL transmitters is coupled to a corresponding subscriber line in a plurality of subscriber lines, wherein each of the plurality of subscriber lines is subject to crosstalk with at least one other of the plurality of subscriber lines, wherein each of the plurality of DSL transmitters is configured to transmit a DMT superframe, and wherein the plurality of DMT superframes has at least one data frame with an identical position index.

15. An apparatus comprising a digital subscriber line (DSL) transmitter comprising an analog front end (AFE), a switch, and a power supply coupled to the AFE via the switch, wherein the DSL transmitter is configured to:
   transmit a discrete multi-tone (DMT) superframe comprising a sync frame and a data frame, wherein a time duration of the superframe is equal to at least a sum of a time duration of the sync frame and twice a time duration of the data frame, wherein the DMT superframe comprises a plurality of data frames including the data frame, wherein a number of the plurality of data frames is denoted as D, wherein D is an integer greater than one, wherein the time duration of the superframe is equal to at least a sum of the time duration of the sync frame and a time duration of D+M data frames, and wherein M is a positive integer indicating the portion of the time duration of the-superframe; and turn off at least a portion of the DSL transmitter for a portion of the time duration of the superframe, wherein the portion of the time duration is no shorter than the duration of the data frame, wherein turning off the portion of the DSL transmitter includes disconnecting the AFE from the power supply by opening the switch, wherein the time duration of the DMT superframe comprises one or more cadences including a first cadence, wherein the first cadence comprises an on period and an off period, wherein the DSL transmitter is further configured to transmit a physical media specific (PMS) message comprising a discontinuous showtime parameter field, wherein the discontinuous showtime parameter field comprises a first octet and a second octet, wherein the first octet indicates a number of data frames in the on period, and wherein the second octet indicates a duration of the off period.

16. The apparatus of claim 15, wherein the DMT superframe further comprises one or more transition frames, and wherein the discontinuous showtime parameter field further comprises a third octet indicating a number of transition frames transmitted in the off period.

17. The apparatus of claim 16, wherein the third octet is intended for a downstream direction, wherein the discontinuous showtime parameter field further comprises a fourth octet indicating a number of transition frames transmitted in the off period, and wherein the fourth octet is intended for an upstream direction.

18. The apparatus of claim 15, wherein during transmission of the DMT superframe a structure of the first cadence is repeated until the time duration of the superframe is completed.

19. The apparatus of claim 15, wherein the DSL transmitter is located on an operator end of a DSL system, and wherein the PMS message is an operator end PMS (O-PMS) message.

20. The apparatus of claim 15, wherein the DSL transmitter is located on a user end of a DSL system, and wherein the PMS message is a remote end PMS (R-PMS) message.

21. An apparatus comprising:
a digital subscriber line (DSL) transmitter that comprises an analog front end (AFE), a switch, and a power supply coupled to the AFE via the switch, wherein the DSL transmitter is configured to:
transmit a discrete multi-tone (DMT) superframe comprising a sync frame and a data frame, wherein a time duration of the superframe is equal to at least a sum of a time duration of the sync frame and twice a time duration of the data frame; and
turn off at least a portion of the DSL transmitter for a portion of the time duration of the superframe, wherein the portion of the time duration is no shorter than the duration of the data frame, wherein turning off the portion of the DSL transmitter includes disconnecting the AFE from the power supply by opening the switch;
a plurality of DSL transmitters including the DSL transmitter, wherein each of the plurality of DSL transmitters is coupled to a corresponding subscriber line in a plurality of subscriber lines, and wherein each of the plurality of subscriber lines is subject to crosstalk with at least one other of the plurality of subscriber lines; and
a processor coupled to the plurality of DSL transmitters, the processor configured to disable a discontinuous mode for the plurality of DSL transmitters when any of the plurality of DSL transmitters is in an initialization stage.

22. The apparatus of claim 21, wherein the processor is further configured to enable the discontinuous mode for the plurality of DSL transmitters when the plurality of DSL transmitters are in a showtime stage.

23. A method implemented in a digital subscriber line (DSL) transmitter, wherein the DSL transmitter comprises:
an analog front end (AFE);
a switch; and
a power supply coupled to the AFE via the switch,
wherein the method comprises:
transmitting a discrete multi-tone (DMT) superframe comprising a sync frame and a data frame, wherein a time duration of the superframe is equal to at least a sum of a time duration of the sync frame and twice a time duration of the data frame;
turning off at least a portion of the DSL transmitter for a portion of the time duration of the superframe, wherein the portion of the time duration is no shorter than the duration of the data frame, wherein turning off the portion of the DSL transmitter includes disconnecting the AFE from the power supply by opening the switch; and
transmitting a message comprising a standard information field denoted as Npar(2), wherein Npar(2) comprises an octet denoted as Octet2, wherein Octet2 comprises eight bits denoted as Bit 1 to Bit 8, wherein Bit 1 of Octet2 indicates whether the DSL transmitter supports a discontinuous showtime mode in an upstream direction, and wherein Bit 2 of Octet2 indicates whether the DSL transmitter supports the discontinuous showtime mode in a downstream direction.

24. The method of claim 23, wherein the DSL transmitter further comprises a line driver (LD) coupled to the AFE and the power supply via a second switch, and wherein turning off the portion of the DSL transmitter includes disconnecting the LD from the power supply by opening the second switch.

25. The method of claim 23, wherein the DMT superframe comprises a plurality of data frames including the data frame, wherein a number of the plurality of data frames is denoted as D, wherein D is an integer greater than one, wherein the time duration of the superframe is equal to at least a sum of the time duration of the sync frame and a time duration of D+M data frames, and wherein M is a positive integer indicating the portion of the time duration of the superframe.

26. The method of claim 25, wherein D+M is no greater than 256.

27. The method of claim 23, further comprising transmitting an on-line reconfiguration (OLR) command comprising a Request Type 7.

28. The method of claim 23, further implemented by an apparatus comprising a plurality of DSL transmitters including the DSL transmitter, wherein each of the plurality of DSL transmitters is coupled to a corresponding subscriber line in a plurality of subscriber lines, and wherein each of the plurality of subscriber lines is subject to crosstalk with at least one other of the plurality of subscriber lines, the method further comprising disabling a discontinuous mode for a plurality of DSL transmitters when any of the plurality of DSL transmitters is in an initialization stage.

29. The method of claim 23, further implemented by an apparatus comprising a plurality of DSL transmitters including the DSL transmitter, wherein each of the plurality of DSL transmitters is coupled to a corresponding subscriber line in a plurality of subscriber lines, and wherein each of the plurality of subscriber lines is subject to crosstalk with at least one other of the plurality of subscriber lines, the method further comprising, wherein the DMT superframe comprises a plurality of data frames including the data frame, wherein the time duration of the superframe is equal to at least a sum of the time duration of the sync frame and a time duration of the plurality of data frames, the method further comprising transmitting a DMT superframe from each of the plurality of DSL transmitters, wherein the plurality of DMT superframes has at least one data frame with an identical position index.

30. A method implemented in a digital subscriber line (DSL) transmitter, wherein the DSL transmitter comprises an analog front end (AFE), a switch, and a power supply coupled to the AFE via the switch, wherein the method comprises:
- transmitting a discrete multi-tone (DMT) superframe comprising a sync frame and a data frame, wherein a time duration of the superframe is equal to at least a sum of a time duration of the sync frame and twice a time duration of the data frame; and
- turning off at least a portion of the DSL transmitter for a portion of the time duration of the superframe,
- wherein the portion of the time duration is no shorter than the duration of the data frame,
- wherein turning off the portion of the DSL transmitter includes disconnecting the AFE from the power supply by opening the switch, wherein the DMT superframe comprises a plurality of data frames including the data frame,
- wherein a number of the plurality of data frames is denoted as D, wherein D is an integer greater than one,
- wherein the time duration of the superframe is equal to at least a sum of the time duration of the sync frame and a time duration of D+M data frames,
- wherein M is a positive integer indicating the portion of the time duration of the superframe,
- wherein the time duration of the DMT superframe comprises one or more cadences including a first cadence,
- wherein the first cadence comprises an on period and an off period,
- wherein the DSL transmitter is further configured to transmit a physical media specific (PMS) message comprising a discontinuous showtime parameter field,
- wherein the discontinuous showtime parameter field comprises a first octet and a second octet, wherein the first octet indicates a number of data frames in the on period, and
- wherein the second octet indicates a duration of the off period.

31. The method of claim 30, wherein the DMT superframe further comprises one or more transition frames, and wherein the discontinuous showtime parameter field further comprises a third octet indicating a number of transition frame transmitted in the off period.

32. The method of claim 31, wherein the third octet is intended for a downstream direction, wherein the discontinuous showtime parameter field further comprises a fourth octet indicating a number of transition frames transmitted in the off period, and wherein the fourth octet is intended for an upstream direction.

33. The method of claim 30, wherein during transmission of the DMT superframe the first cadence is repeatedly transmitted until the time duration of the superframe is completed.

34. An apparatus comprising:
- a digital subscriber line (DSL) receiver comprising a controller, wherein the DSL receiver is configured to:
- receive a discrete multi-tone (DMT) superframe comprising a sync frame and a data frame, wherein a time duration of the superframe is equal to at least a sum of a time duration of the sync frame and twice a time duration of the data frame; and
- turn off at least a portion of the DSL receiver for a portion of the time duration of the superframe, wherein the controller in the DSL receiver is kept on for the portion of the time duration of the superframe while the portion of the DSL receiver is turned off, and wherein the portion of the time duration is no shorter than the duration of the data frame.

35. The apparatus of claim 34, wherein the DSL receiver comprises:
- an analog front end (AFE);
- a switch; and
- a power supply coupled to the AFE via the switch,
- wherein turning off the portion of the DSL receiver includes disconnecting the AFE from the power supply by opening the switch.

36. The apparatus of claim 35, wherein the DSL receiver further comprises a baseband processor coupled to the AFE and the power supply via a second switch, wherein the baseband processor is configured to generate signals that feed into the AFE, wherein turning off the portion of the DSL receiver includes disconnecting the baseband processor from the power supply by opening the second switch.

37. The apparatus of claim 35, wherein the DMT superframe further comprises a transition frame, wherein the time duration of the superframe is equal to at least a sum of the time duration of the sync frame, a time duration of the transition frame, and twice the time duration of the data frame.

* * * * *